(12) United States Patent
Warhurst et al.

(10) Patent No.: US 12,060,238 B1
(45) Date of Patent: Aug. 13, 2024

(54) TRANSPORT VEHICLE CONTAINER HANDLING SYSTEM AND ASSOCIATED METHODS

(71) Applicant: EMHIP, LLC, Tampa, FL (US)

(72) Inventors: Peter Warhurst, Windermere, FL (US); Roy Hensler, Clearwater, FL (US); Robert P Allison, St. Pete Beach, FL (US)

(73) Assignee: EMHIP, LLC, Tampa, FL (US)

( * ) Notice: Subject to any disclaimer, the term of this patent is extended or adjusted under 35 U.S.C. 154(b) by 0 days.

(21) Appl. No.: 18/363,180

(22) Filed: Aug. 1, 2023

(51) Int. Cl.
*B65G 67/24* (2006.01)

(52) U.S. Cl.
CPC .................................... *B65G 67/24* (2013.01)

(58) Field of Classification Search
CPC . B65G 67/24; B65G 67/04; B60P 1/44; B60P 1/4414; B62D 21/14
USPC ........ 414/475, 477, 480, 522, 523; 280/789, 280/744, 144, 456.1, 467, 765.1, 478.1, 280/482
See application file for complete search history.

(56) References Cited

U.S. PATENT DOCUMENTS

| | | | |
|---|---|---|---|
| 3,879,050 A * | 4/1975 | Young ................. | E04B 1/34352 D12/101 |
| 4,358,133 A * | 11/1982 | Stucky .................. | B62D 63/08 180/9.48 |
| 5,401,050 A * | 3/1995 | Baker .................. | B62D 53/061 280/789 |
| 5,419,577 A * | 5/1995 | Murray ................ | B62D 53/067 280/789 |
| 6,071,062 A | 6/2000 | Warhurt et al. | |
| 6,709,219 B2 | 3/2004 | Reed, III | |
| 6,726,431 B2 | 4/2004 | Morrell | |
| 7,033,128 B2 * | 4/2006 | Poindexter ............ | B60P 1/4414 414/544 |
| 7,074,004 B2 | 7/2006 | Lockamy et al. | |
| 7,811,044 B2 | 10/2010 | Warhurst | |
| 8,702,119 B2 * | 4/2014 | Silz ........................ | B60P 3/066 296/26.15 |
| 9,428,097 B2 | 8/2016 | Konchan et al. | |
| 2006/0285959 A1 * | 12/2006 | Warhurst .............. | B60P 1/6445 414/540 |
| 2007/0211205 A1 | 9/2007 | Lowecki | |
| 2007/0231113 A1 | 10/2007 | McGurn | |
| 2008/0211289 A1 * | 9/2008 | Beiler ....................... | B60P 1/00 298/19 R |
| 2012/0296781 A1 | 11/2012 | Edwards et al. | |

\* cited by examiner

*Primary Examiner* — Glenn F Myers
(74) *Attorney, Agent, or Firm* — Shumaker, Loop & Kendrick, LLP; James D. Miller

(57) ABSTRACT

A container handling system including a substantially stationary first frame structure and a movable second frame structure facilitating loading a container to and unloading the container from of a transport vehicle. The first frame structure is configured to be fixed coupled to a chassis of the transport vehicle. The second frame structure is axially movable relative to the first frame structure and includes a handling device disposed thereon configured to raise and lower the container. Further, the second frame structure is pivotable relative to the first frame structure to facilitate unloading or loading the container on an irregular surface such as the ground.

17 Claims, 38 Drawing Sheets

24, 44, 67, 88

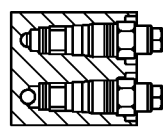
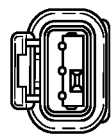
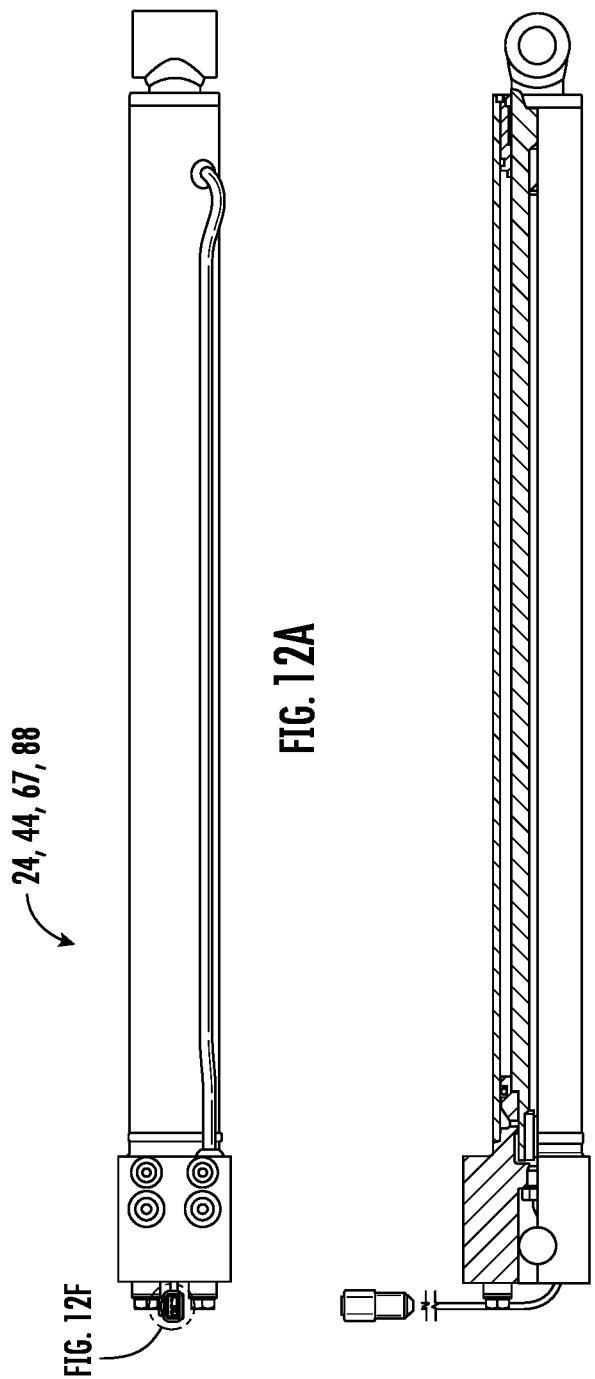
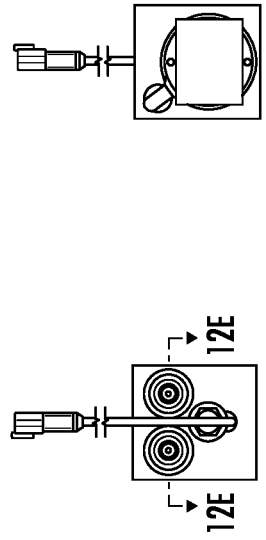

TRANSPORT VEHICLE CONTAINER HANDLING SYSTEM AND ASSOCIATED METHODS

CROSS-REFERENCE TO RELATED APPLICATION

This application claims the benefit of U.S. Provisional Patent Application Ser. No. 63/370,005, filed Aug. 1, 2022, the entirety of which is herein incorporated by reference.

FIELD

The present disclosure relates generally to a container handling system, and more particularly to a transport vehicle container handling system having a substantially stationary frame and a movable frame facilitating loading a container to and unloading the container from a transport vehicle.

BACKGROUND

Conventional container systems are typically used to lift shipping type containers onto a bed of a truck or trailer unit. These systems employ a variety of powered mechanisms where a vehicle is positioned on a substantially level or horizontal loading and unloading support surface. However, there can be situations where an unloading surface and the vehicle are not parallel (for example when the vehicle is parked on a hill, a sloped driveway, or other irregular surfaces). Thus, it is often difficult to load the container to or unload the container form the vehicle. In situations where there is an irregular unloading surface, an aerial lifting device or boom may be required to load or unload the container. Operation of these types of devices can be difficult and expensive.

In general, when the aerial lifting device is to be used at a remote site, the container is loaded on a transport vehicle equipped with a loading bed or unloaded again at the site. Use of the aerial lifting device for loading and unloading the container also results in additional time, which further adds to the cost. Moreover, when the truck bed is not level, horizontal, or parallel to the support surface adjacent to the vehicle, it is difficult to maneuver the vehicle bed to a proper position for loading and unloading the container.

Accordingly, there exists a need in the art for a container handling system which facilitates loading containers from and unloading containers to an irregular surface in a simple and convenient manner.

SUMMARY

In concordance and agreement with the instant disclosure, a container handling system which facilitates loading containers from and unloading containers to an irregular surface in a simple and convenient manner has surprisingly been invented. The exemplary embodiment(s) described hereinbelow and shown in the drawings disclose a container handling system that is convenient and easy to use, lightweight yet durable in design, and versatile in application.

In one embodiment, a container handling system, comprises: a first frame structure configured to be coupled to a transport vehicle; and a second frame structure movably coupled to the first frame structure, wherein the second frame structure is configured to permit a container to be at least one of loaded from and unloaded onto an irregular surface.

As aspects of some embodiments, the second frame structure is pivotably coupled to the first frame structure.

As aspects of some embodiments, the first frame structure includes at least one cross-member.

As aspects of some embodiments, the at least one cross-member of the first frame structure is a hollow member configured to receive a pair of opposing movable members therein, each of the movable members is selectively positionable between a first positon and a second position.

As aspects of some embodiments, the container handling system further comprises at least one actuator configured to selectively position the movable members of the first frame structure between the first position and the second position.

As aspects of some embodiments, the first frame structure includes a pair of spaced apart guide members coupled to an outboard end of each of the movable members.

As aspects of some embodiments, the guide members are positioned generally parallel to rails of a chassis of the transport vehicle.

As aspects of some embodiments, at least one of the guide members includes at least one locking element provide thereon to secure the container to the transport vehicle.

As aspects of some embodiments, the second frame structure includes at least one side rail having a plurality of stanchions disposed thereon.

As aspects of some embodiments, the stanchions are spaced apart to accommodate the container therebetween.

As aspects of some embodiments, the second frame structure further includes at least one cross-member disposed between a corresponding pair of stanchions.

As aspects of some embodiments, the second frame structure includes at least one cross-member disposed between a front one of the stanchions and a rear one of the stanchions.

As aspects of some embodiments, the at least one cross-member of the second frame structure is a hollow member configured to receive a pair of opposing movable members therein, each of the movable members is selectively positionable between a first positon and a second position.

As aspects of some embodiments, the container handling system further comprises at least one actuator configured to selectively position the movable members of the second frame structure between the first position and the second position.

As aspects of some embodiments, the second frame structure is provided with a pulley supported by at least one of the movable members of the second frame structure and a cable received in the pulley.

As aspects of some embodiments, the container handling system further comprises at least one drive assembly configured to move the second frame structure relative to the first frame structure.

As aspects of some embodiments, the at least one drive assembly moves the second frame structure relative to the first frame structure in a longitudinal direction of a chassis of the transport vehicle between a first position and a second position.

As aspects of some embodiments, a portion of the at least one drive assembly is coupled to a side rail of the second frame structure and another portion of the at least one drive assembly is coupled to a guide member of the first frame structure via a drive mechanism.

In another embodiment, a container handling system, comprises: a first frame structure configured to be coupled to a transport vehicle; and a second frame structure coupled to the first frame structure, wherein the second frame structure is configured to move relative to the first frame structure while remaining generally parallel to an irregular surface.

In yet another embodiment, a method for handling a container, comprises steps of: providing a system including a first frame structure and a second frame structure movably coupled to the first frame structure, wherein the first frame structure is configured to be coupled to a transport vehicle, and the second frame structure is configured to permit a container to be at least one of loaded from and unloaded onto an irregular surface; and handling the container to at least one of load, unload, and transport the container.

BRIEF DESCRIPTION OF THE DRAWINGS

The above-mentioned, and other features and objects of the present disclosure, and the manner of attaining them, will become more apparent and the present disclosure itself will be better understood by reference to the following descriptions of embodiments of the present disclosure taken in conjunction with the accompanying drawings, wherein:

FIGS. 12A-12F illustrate another exemplary actuator for the container handling system of FIG. 1;

DETAILED DESCRIPTION

Figures 1, 1A:
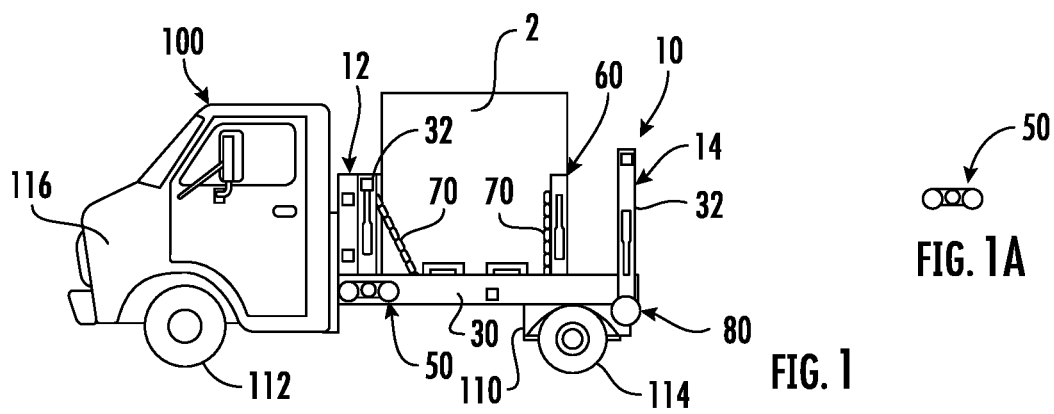
FIG. 1 is a schematic side elevational view of a transport vehicle provided with a container handling system according to an embodiment of the disclosure showing the container handling system in a nested, transport position.
FIG. 1A is a schematic side elevational view of a drive assembly configured to permit a frame structure of the container handling system to move relative to another frame structure thereof.
Figure 2:
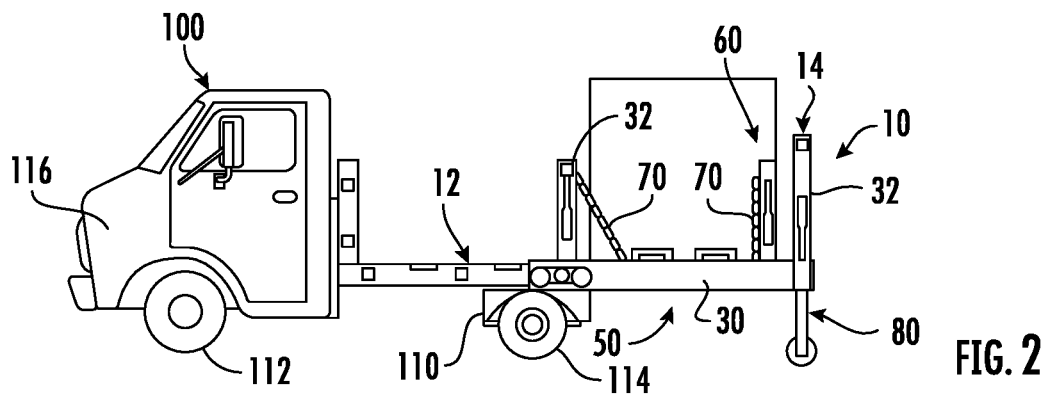
FIG. 2 is a schematic side elevational view of the transport vehicle and the container handling system of FIG. 1, showing a handling device of the container handling system in an intermediate position wherein the container is in a raised position.
Figure 3:
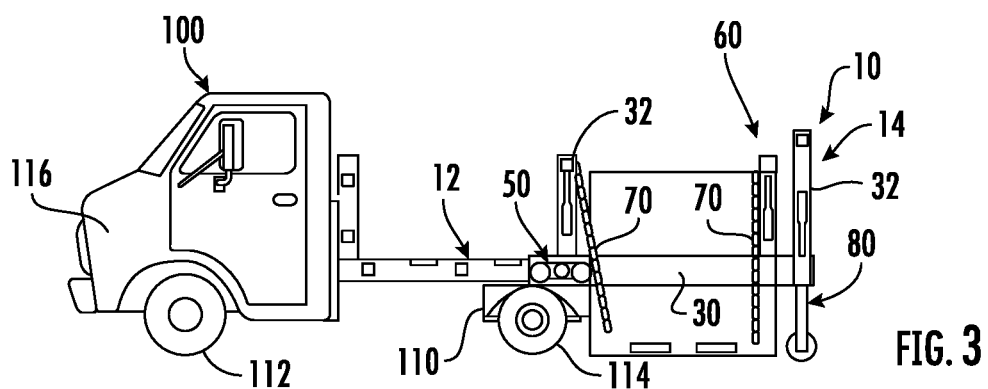
FIG. 3 is a schematic side elevational view of the transport vehicle and the container handling system of FIG. 1, showing the handling device in a lowered position.
Figure 4:
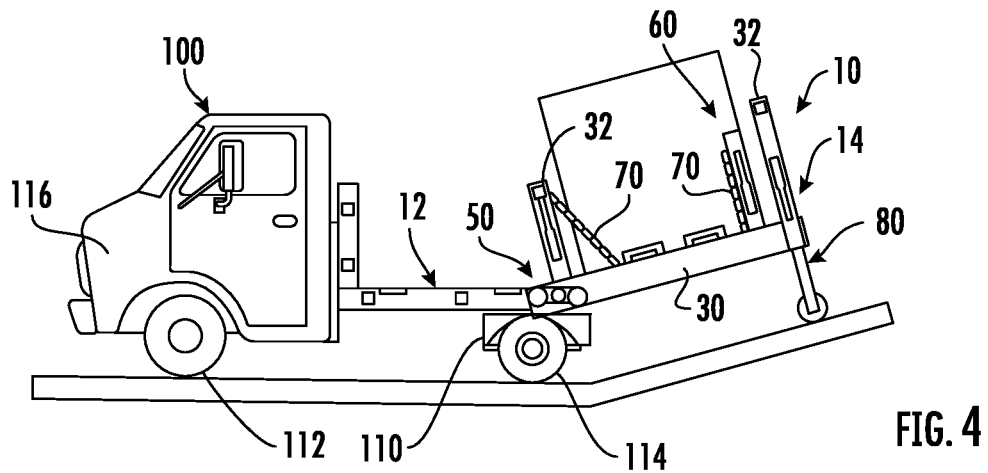
FIG. 4 is a schematic side elevational view of the transport vehicle and the container handling system of FIG. 1, showing the handling device in an intermediate position wherein the container handling system is on an irregular surface.

The following description of technology is merely exemplary in nature of the subject matter, manufacture and use of one or more embodiments, and is not intended to limit the scope, application, or uses of any specific embodiment claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-7 and 13-26 illustrate a transport vehicle 100 provided with a handling system 10 for a portable storage container 2. It should be appreciated that the system 10 may also be applicable and adapted to many different types of containers as well as other objects. For example, the system 10 may be configured to be used with garbage or debris dumpsters, fuel tanks, or other containers, receptacles, tanks, and the like. As another example, the system 10 may be configured to be used as a light-vehicle carrier. It is understood that the system 10 may be used for various residential, commercial, industrial, and agricultural applications.

Figure 13:
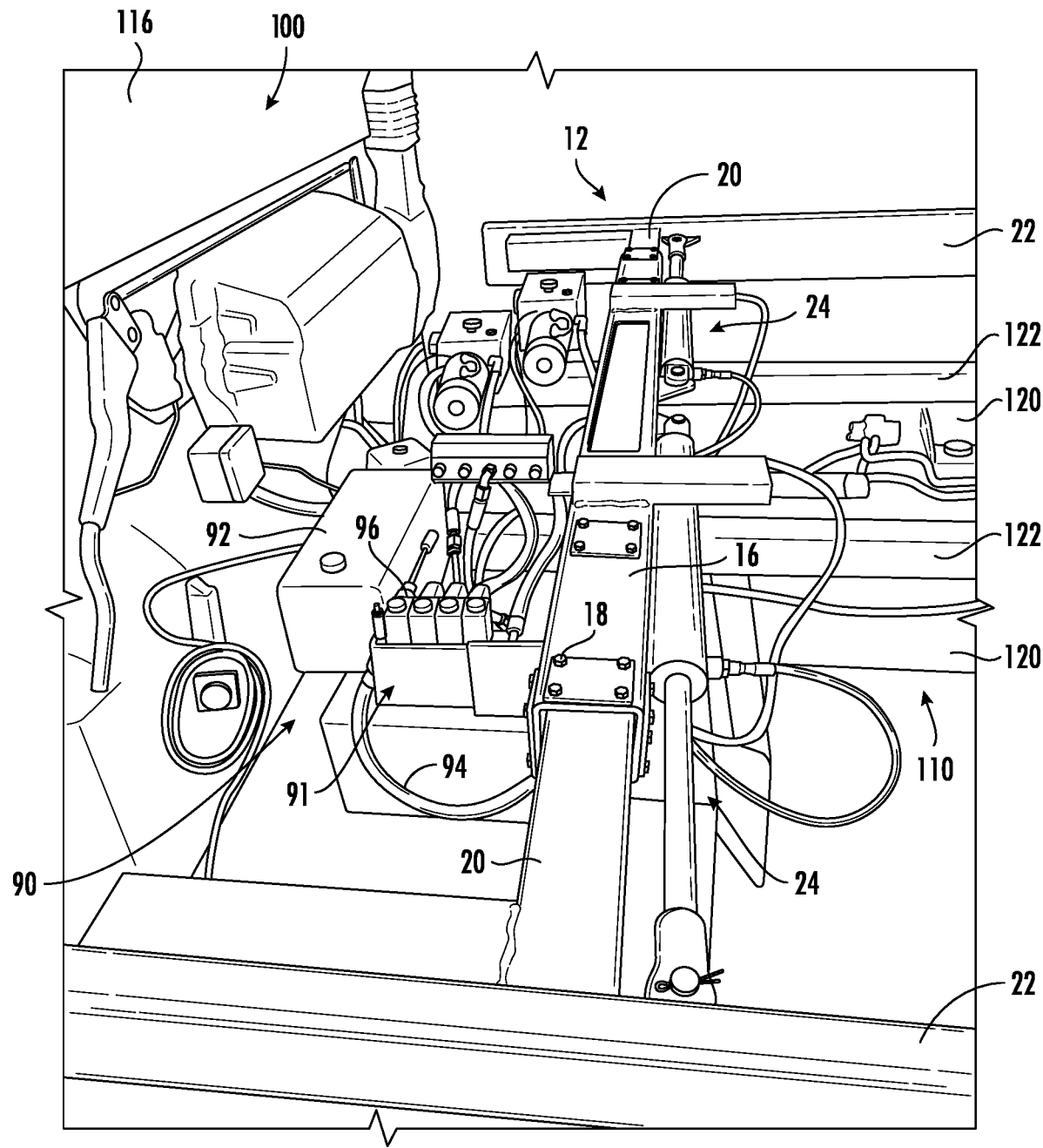
FIGS. 13-27 illustrate various views of a transport vehicle provide with a container handling system according to an embodiment of the disclosure.
Figure 14:
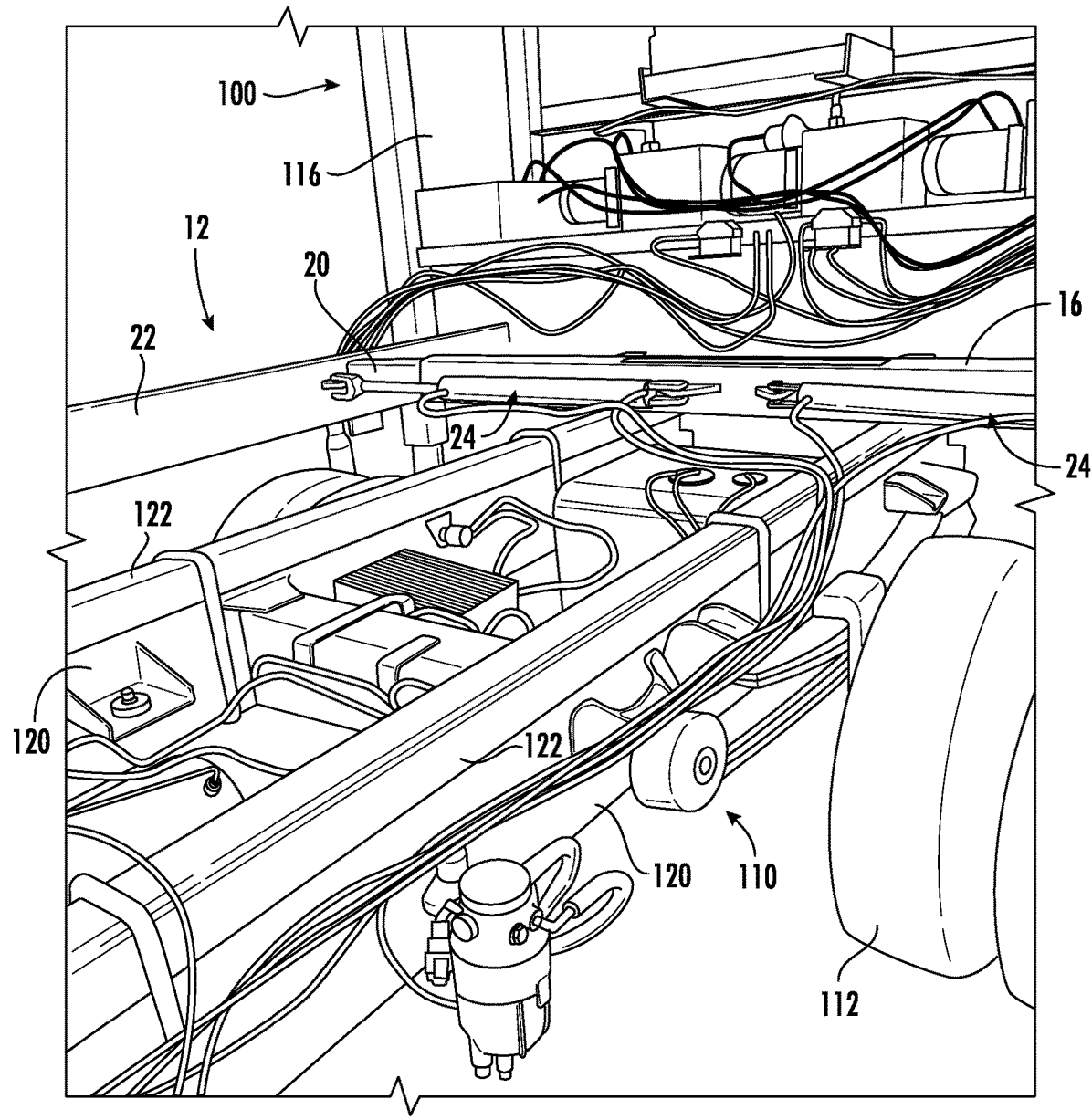

The system 10 shown may be configured to cooperate with the transport vehicle 100. It is understood, however, that the system 10 may be transported by various other modes of transportation. As shown the transport vehicle 100 may be a commercial vehicle (e.g. truck) that generally comprises a chassis 110 extending in a longitudinal direction between a front wheels 112 and a rear wheels 114, and a cab 116 may be disposed on the chassis 110 adjacent the front wheels 112. The transport vehicle 100 may be configured to receive one or more containers 2 behind the cab 116 on a desired surface of the chassis 110 or another support structure 118, depicted in FIGS. 5-7, coupled to the chassis 110. In certain embodiments, the chassis 110 may include a pair of spaced apart rails 120, as shown in FIGS. 13 and 14, each of which may be configured to receive and be coupled to a corresponding one of a pair of support members 122, shown in FIGS. 5-7 and 13-14, of the support structure 118 thereon.

As best seen in FIGS. 1 and 2-7, the system 10 may include a first frame structure 12 and a second frame structure 14. The first frame structure 12 may be fixedly coupled to the chassis 110 of the transport vehicle 100, via at least one of the rails 120 and the support members 122 of the support structure 118. In some embodiments shown in FIGS. 13 and 14, a pair of cross-members 16 of the first frame structure 12 may be fixedly coupled to at least one of the rails 120 and the support members 122 of the support structure 118 to secure the first frame structure 12 to the chassis 110. More or less of the cross-members 16 than shown may be employed if desired. It is understood that the cross-members 16 may be coupled to at least one of the rails 120 and the support members 122 of the support structure 118 by any suitable means as desired. For example, a plurality of mechanical fasteners 18 may be employed.

One or more of the cross-members 16, shown in FIGS. 5-7 and 13-15, may be in sliding engagement with one or more movable members 20, shown in FIGS. 5-7 and 13-15. In some embodiments, each of the cross-members 16 may be a hollow member configured to receive a pair of opposing movable members 20 therein. The movable members 20 may be slidingly disposed within each open end of the cross-members 16 to permit a movement of the movable members 20 between a retracted first position and an extended second position. As more clearly shown in FIGS. 5-7 and 13-15, a pair of spaced apart guide members 22 may be coupled to an outboard end of each of the movable members 20 extending in the longitudinal direction of the chassis 110. The guide members 22 may be positioned generally parallel to the rails 120 of the chassis 110 and generally perpendicular to the cross-members 16 of the first frame structure 12.

As more clearly shown in FIGS. 5-7 and 13-14, one or more actuators 24 may be employed to selectively position the movable members 20 between the first position and the second position, which in turn, causes the guide members 22 to also be selectively positioned between a retracted first position and an extended second position. When in the first position, the guide members 22 may be within confines of the transport vehicle 100, namely within or slightly outside a track width thereof. On the contrary, when in the second position, the guide members 22 may extend well outside the confines of the transport vehicle 100, namely much wider than the track width thereof. In some embodiments, at least one of the actuators 24 employed in the system 10 may be a mechanical actuator such as a hydraulic cylinder, for example. A barrel with a piston of the hydraulic cylinder may be coupled to one of the cross-members 16 and an end of a piston rod connected to the piston may be coupled to a corresponding one of the guide members 22, or vice versa. Various other types of actuators 24 may be used to move and position the guide members 22 if desired.

Figure 5:
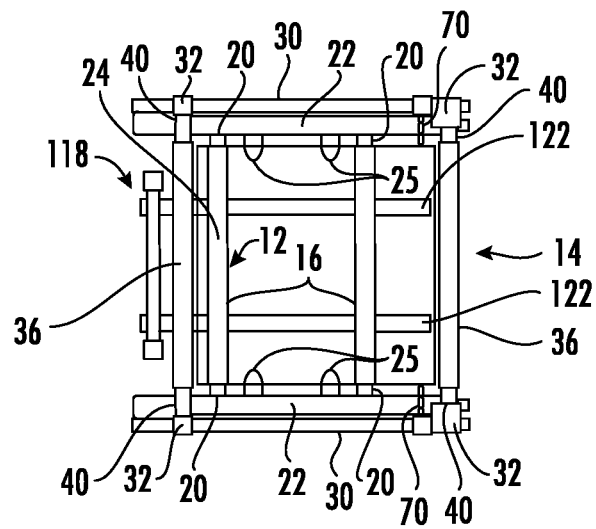
FIG. 5 is a top plan view of the container handling system of FIG. 1, showing the container handling system in the nested, transport position.
Figure 6:
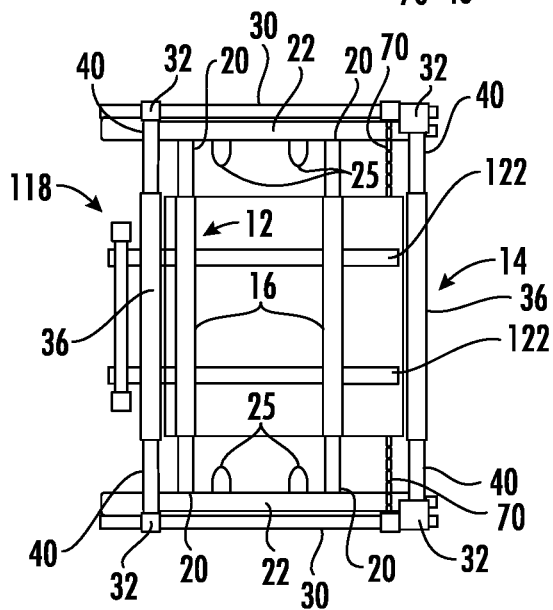
FIG. 6 is a top plan view of the container handling system of FIG. 1, showing a first frame structure of the container handling system in an expanded position prior to a raising of the container.
Figure 7:
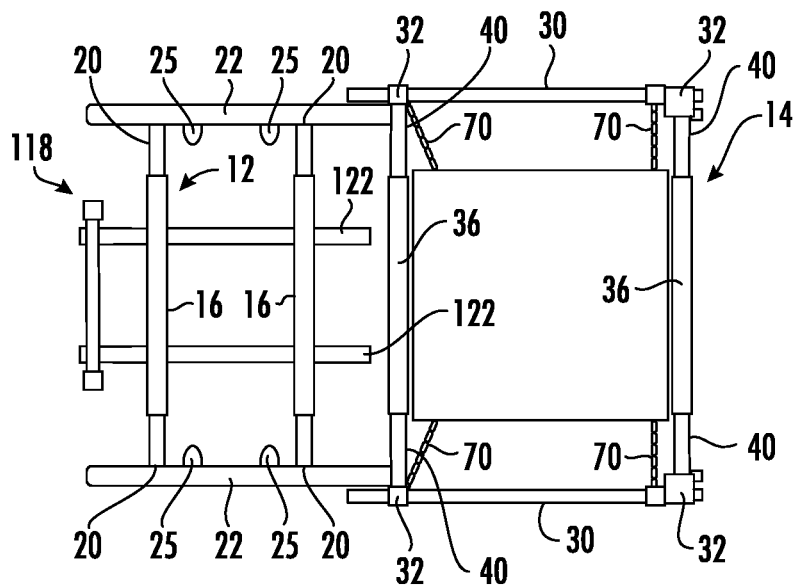
FIG. 7 is a top plan view of the container handling system of FIG. 1, showing the container handling system in an intermediate position wherein a container is in the raised position.

As illustrated in FIGS. 5-7, the guide members 22 may include one or more locking elements 25 provided thereon. In some embodiments, the locking elements 25 may be inwardly extending projections formed on an inboard surface of the guide members 22. When the guide members 22 are in the first position, the locking elements 25 may be configured to be received into openings formed in the container 2 to secure the container 2 to the transport vehicle 100 and militate against an undesired movement of the container 2 during the transport thereof. The locking elements 25 are also configured to be removed from the openings formed in the container 2 as the guide members 22 are caused to move from the first position to the second position. When the guide members 22 are in the second position, the locking elements 25 may be configured to be completely removed from the opening formed in the container 2 to release the container 2 from the transport vehicle 100 and permit the unloading thereof.

Figure 24:
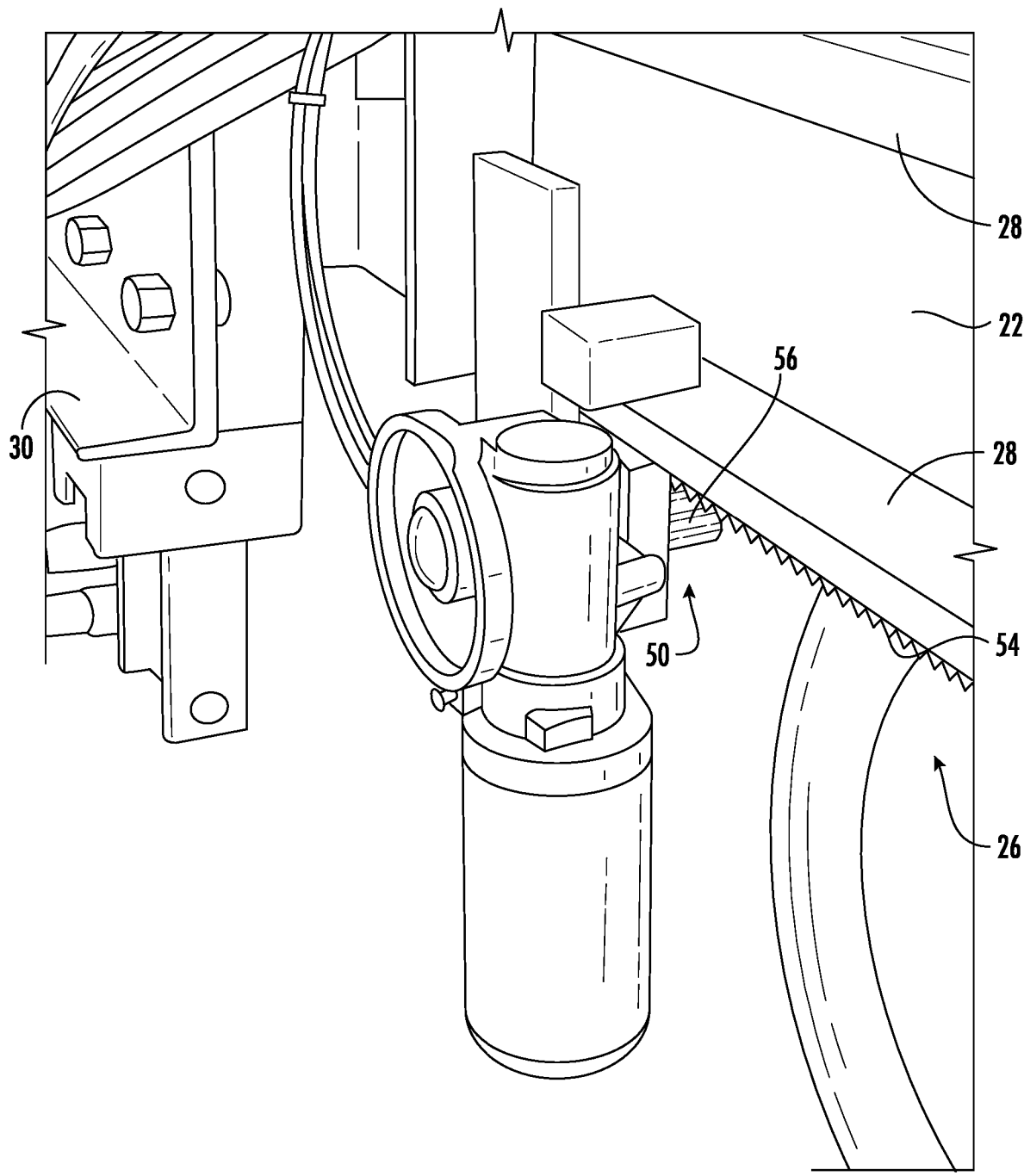
Figure 25:
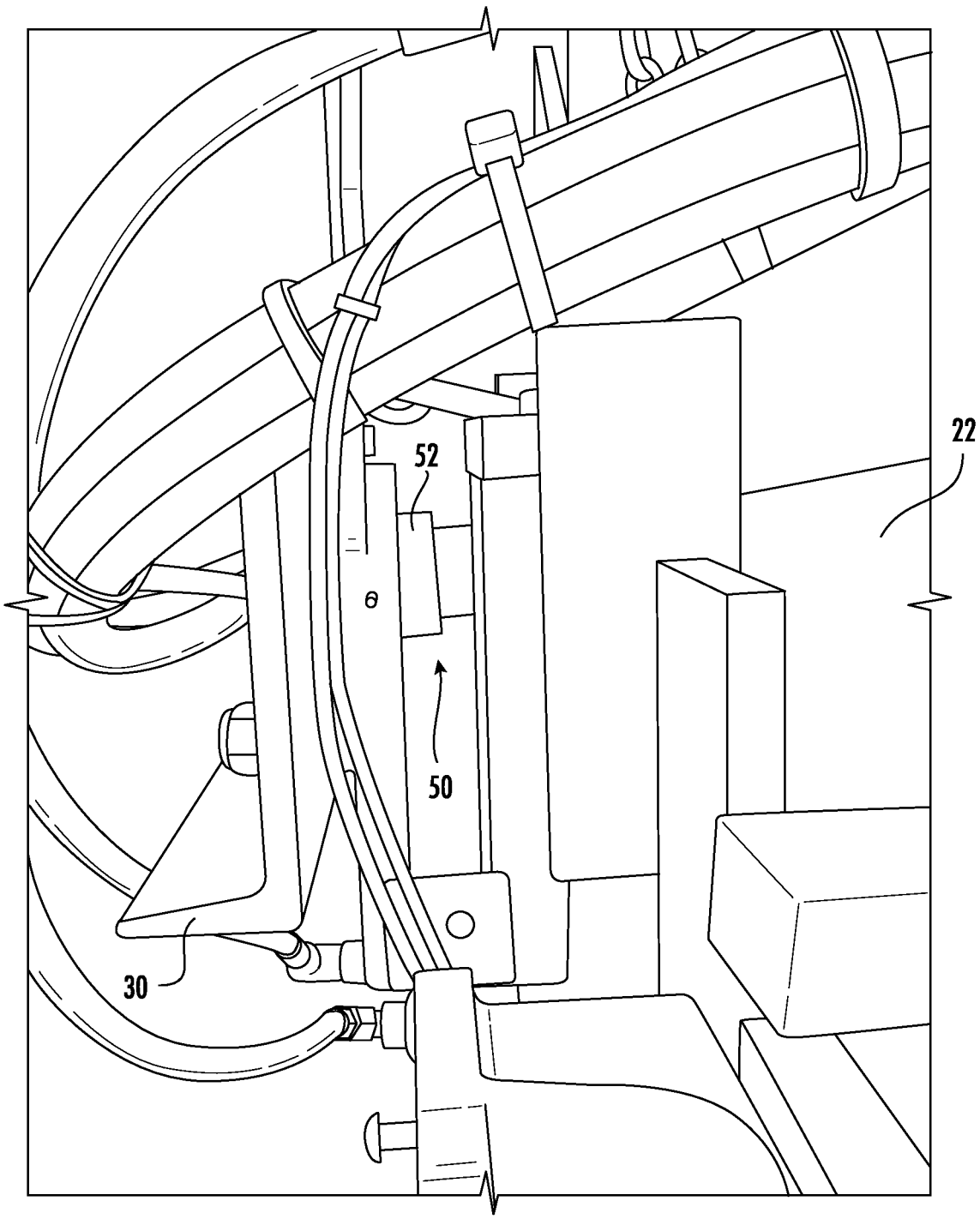
Figure 26:
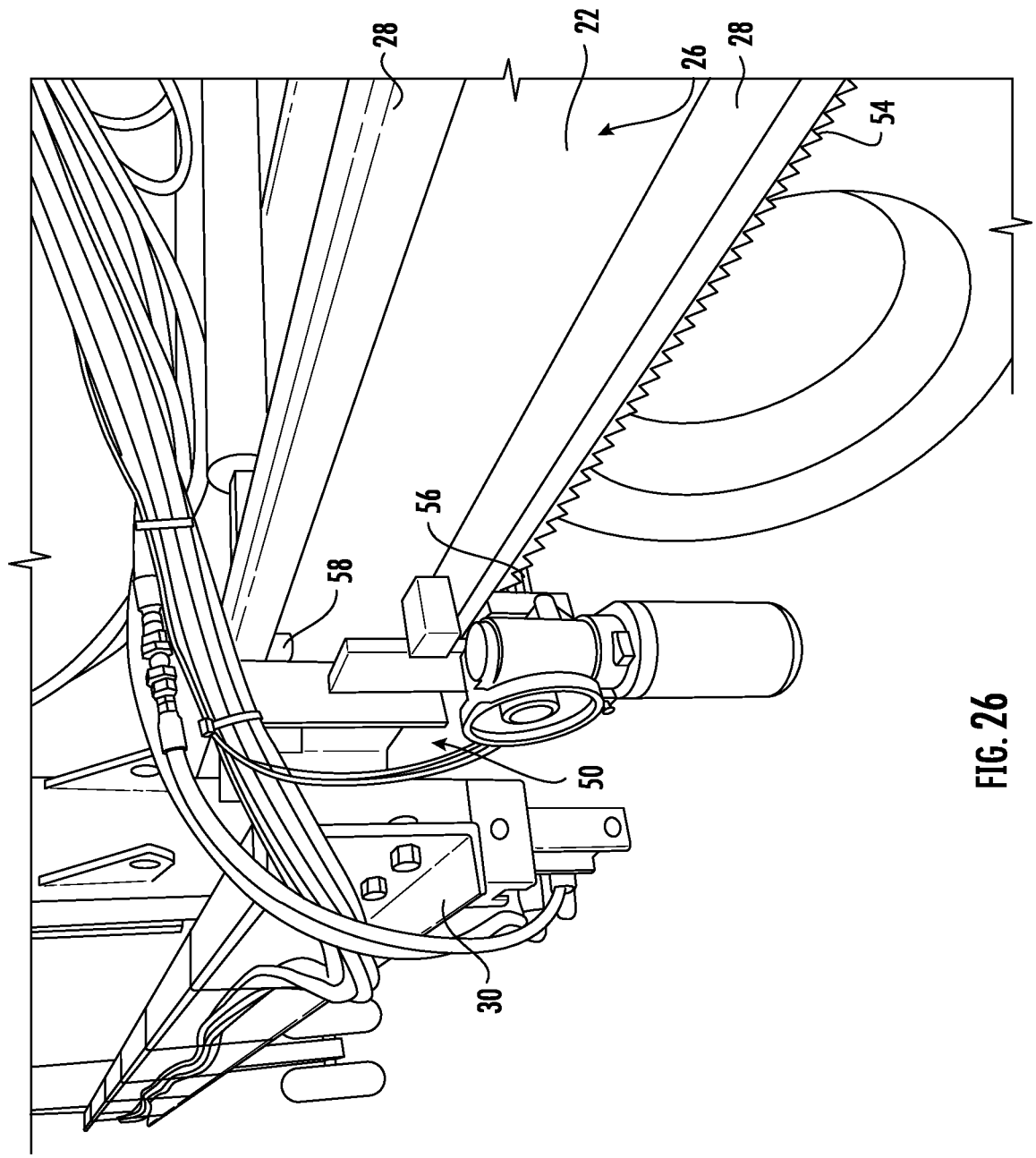

In certain embodiments, each of the guide members 22 may further include at least one guide feature 26, shown in FIGS. 24 and 26, for directing a movement of the second frame structure 14. As a non-limiting example, the guide feature 26 may include one or more channels 28 formed on an outboard surface of the guide members 22 extending along an upper edge and/or a lower edge thereof in the longitudinal direction of the chassis 110.

Referring now to FIGS. 1, 2-7, and 13-26, the second frame structure 14 may be movably coupled to the first frame structure 12. In certain embodiments, the second frame structure 14 may include a pair of spaced apart side rails 30 extending in the longitudinal direction of the chassis 110 and a plurality of stanchions 32. A pair of the stanchions 32 may be disposed on each of the side rails 30. More preferably, one of the stanchions 32 may be disposed on an inboard surface of each end of the side rails 30 and laterally spaced to accommodate the container 2 therebetween. As illustrated, the stanchions 32 may be fixedly coupled to the associated one of the side rails 30 by a welding process. It is understood, however, that the stanchions 32 may be coupled to the side rails 30 by any suitable method, for example, mechanical fasteners.

As more clearly depicted in FIGS. 5-7 and 15, a pair of cross-members 36 may also be disposed in a space between corresponding pairs of the stanchions 32, extending generally perpendicular to the side rails 30 of the second frame structure 14. One of more of the cross-members 36 may be in sliding engagement with one or more movable members 40. In certain embodiments, each of the cross-members 36 may be a hollow member configured to receive a pair of opposing movable members 40 therein. The movable members 40 may be slidingly disposed within each open end of the cross-members 36 to permit a movement of the movable members 40 between a retracted first position and an extended second position. An outboard end of each of the movable members 40 may be fixedly coupled to one of the stanchions 32 by any suitable method as desired. For example, the movable members 40 may be coupled to the stanchions 32 by a welding process.

Figure 22:
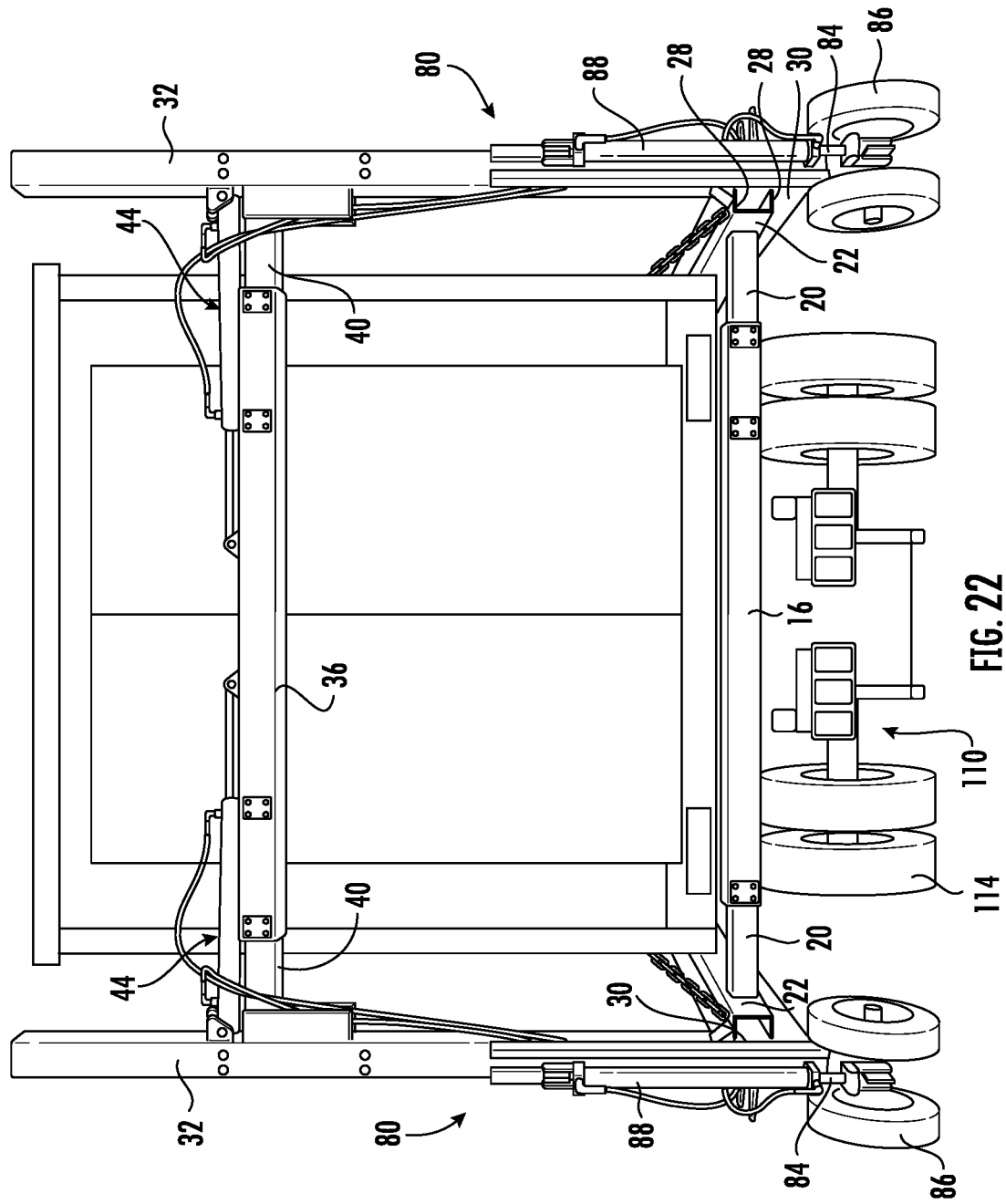
Figure 23:
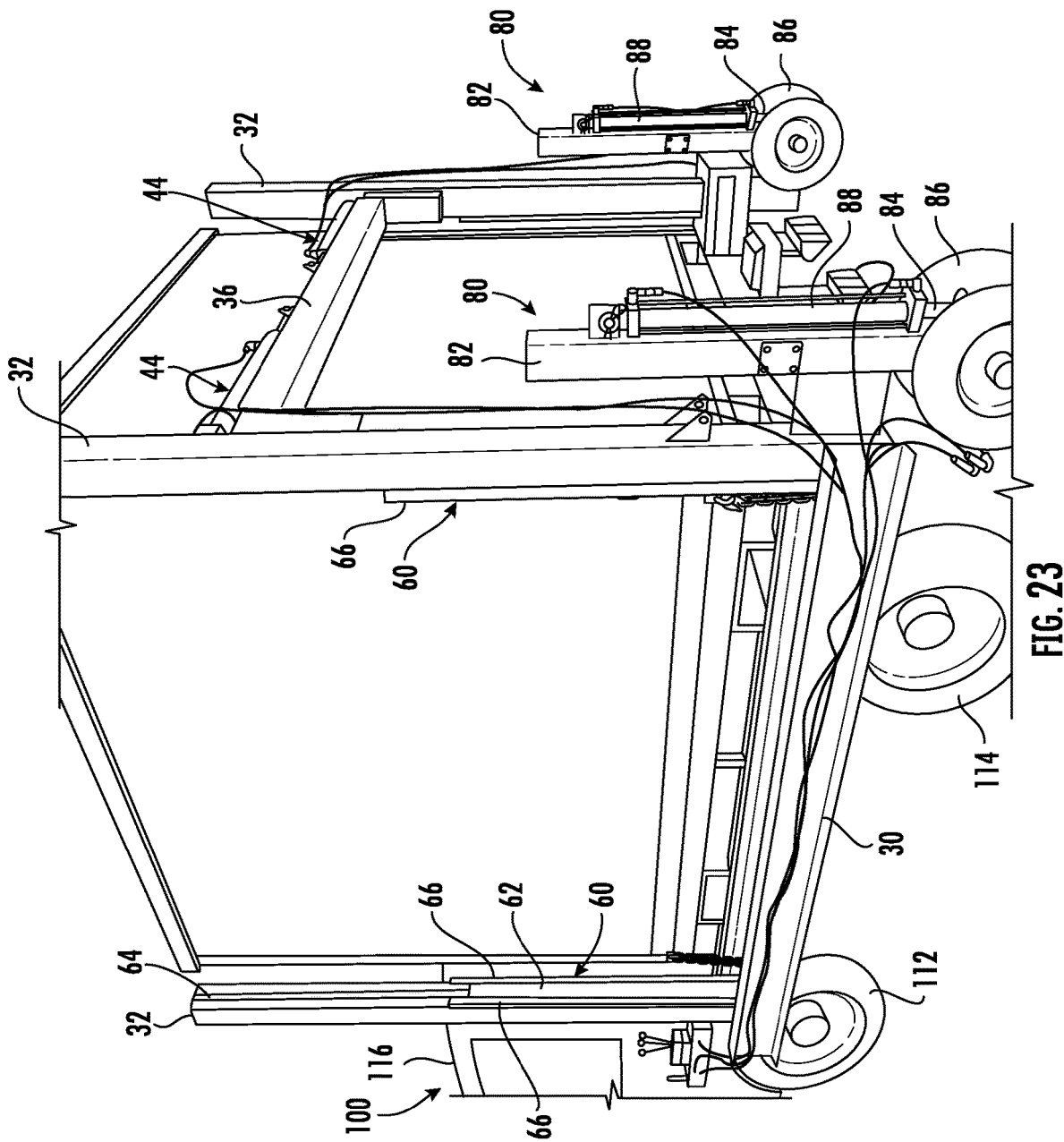

As more clearly shown in FIG. 22, one or more actuators 44 may be employed to selectively position the movable members 40 between the first position and the second position, which in turn, causes the stanchions 32 to also be selectively positioned between a retracted first position and an extended second position. When in the first position, the stanchions 32 may be within confines of the transport vehicle 100, namely within or slightly outside a track width thereof. Conversely, when in the second position, the stanchions 32 may extend well outside the confines of the transport vehicle 100, namely much wider than the track width thereof. In some embodiments, at least one of the actuators 44 employed in the system 10 may be a mechanical actuator such as a hydraulic cylinder, for example. As illustrated, a barrel with a piston of the hydraulic cylinder may be coupled to one of the stanchions 32 and an end of a piston rod connected to the piston may be coupled to a corresponding one of the cross-members 36. Various other types of actuators 44 may be used to move and position the stanchions 32 if desired.

At least one drive assembly 50, depicted in FIGS. 1, 1A, 2-4, and 24-26, may be employed to move the second frame structure 14 relative to the first frame structure 12 in the longitudinal direction of the chassis 110 between a forward first position and a rearward second position. In certain embodiments, the drive assembly 50 may be operably connected to one of the guide members 22 and one of the side rails 30. In the embodiment shown, a portion of the drive assembly 50 may be rotatably coupled to a forward end of the side rail 30 and another portion of the drive assembly may be coupled to the guide member 22 via a drive mechanism 52. In other embodiments, the first portion of the drive assembly 50 may be coupled to the side rail 30 via the drive mechanism 52 and the second portion of the drive assembly 50 may be rotatably coupled to the guide member 22, if desired. The drive mechanism 52 may be any suitable drive mechanism as desired. For example, the drive mechanism 52 may be a rack 54 and pinion 56 with the rack 54 provided on one of the guide member 22 and the portion of the drive assembly 50 and the pinion 56 provided on a remaining one of the guide member 22 and the portion of the drive assembly 50. In the embodiment shown, the rack 54 may be provided on a lower edge of the guide member 22 and the pinion 56 may be provided on an inboard portion of the drive assembly 50. The drive mechanism 52 may be driven by hydraulic power, for example.

The drive assembly 50 may further include a guide element 58 configured to cooperate with the least one guide feature 26 of the guide member 22 to direct the movement of the second frame structure 14 relative to the first frame structure 12. In some embodiments, the guide element 58 may include a roller configured to move within at least one of the channels 28 of the guide feature 26.

As illustrated in FIGS. 1, 2-4, 16-19, 21, and 23, the system 10 may further include a handling device 60 configured to facilitate the loading and the unloading of the container 2 onto and from the transport vehicle 100. In certain embodiments, the handling device 60 comprises a plurality of vertical movable members 62 in sliding engagement with the stanchions 32. Each of the stanchions 32 may be a hollow member having a slot 64 formed therein and one or more guide features 66 provided thereon. A portion of the movable member 62 may be extend through the slot 64 and be secured within a hollow interior of the stanchion 32 in such a manner that the slot 64 performs as a guide for the movable member 62. At least a portion of the movable member 62 may be received in the guide features 66 which also perform as guides for the movable member 62. In other embodiments, such as that shown in FIGS. 28-41, the handling device 60 may comprise a cable or chain system configured to cooperate with the stanchions 32 to facilitate the loading and the unloading of the container 2 onto and from the transport vehicle 100.

One or more actuators 67 may be employed to selectively position the movable members 62 between an upper first position and a lower second position, which in turn, causes the container 2 to also be selectively positioned between a raised first position and a lowered second position. When in the first position, the container 2 may be raised from the chassis 110 of the transport vehicle 100 and/or a pickup location and freely moved to be loaded or unloaded onto or from the transport vehicle 100. Conversely, when in the second position, the container 2 may be stationary and disposed at a desired drop-off location. Additionally, when in an intermediate position between the first and second positions of the movable members 62, the container 2 may be stationary and disposed on the chassis 110 of the transport vehicle 100 for transport thereof. In some embodiments, at least one of the actuators 67 employed in the system 10 may be a mechanical actuator such as a hydraulic cylinder, for example. A barrel with a piston of the hydraulic cylinder may be coupled to one of the stanchions 32 and an end of a piston rod connected to the piston may be coupled to a corresponding one of the moveable members 62. Various other types of actuators 67 may be used to move and position the movable members 62 of the handling device 60, if desired.

Each of the movable members 62 may further include one or more attachment points 68 for releaseably coupling restraints 70. In one embodiment, at least one of the attachments points 68 may include a bracket 71 provided on the movable member 62. The bracket 71 may be configured to releaseably couple a first end of the restraint 70 to the movable member 62. A second end of the restraint 70 may be releaseably coupled to the container 2. The restraints 70 may be employed to facilitate the loading and the unloading of the container 2, while also militating against an undesired movement of the container 2 during the transport thereof. As such, the system 10 may not require additional restraints attached to the container 2 by a user prior to the transport thereof. Various types of restraints 70 may be used such as a tether, a chain, a strap, a rope, and the like, for example.

In some embodiments, one or more support members 72, shown in FIGS. 5-7, and 15-20, may be disposed in a space between a corresponding pairs of the stanchions 32, extending generally parallel to the side rails 30 and in the longitudinal direction of the chassis 110. Each end of the support members 72 may be releaseably coupled to an associated one of the movable members 62 to permit the container 2 to be placed and removed from the truck vehicle 100 by a separate handling system or device (e.g. a forklift). In one embodiment, the ends of the support members 72 may be releaseably coupled to the associated moveable members 62 at the attachment points 68. As a non-limiting example, the ends of the support member 72 are releaseably coupled to the brackets 71 by at least one mechanical fastener 73. In other embodiments, the space between the stanchions 32 may be completely open without any support member 72 disposed therebetween.

Figure 27:
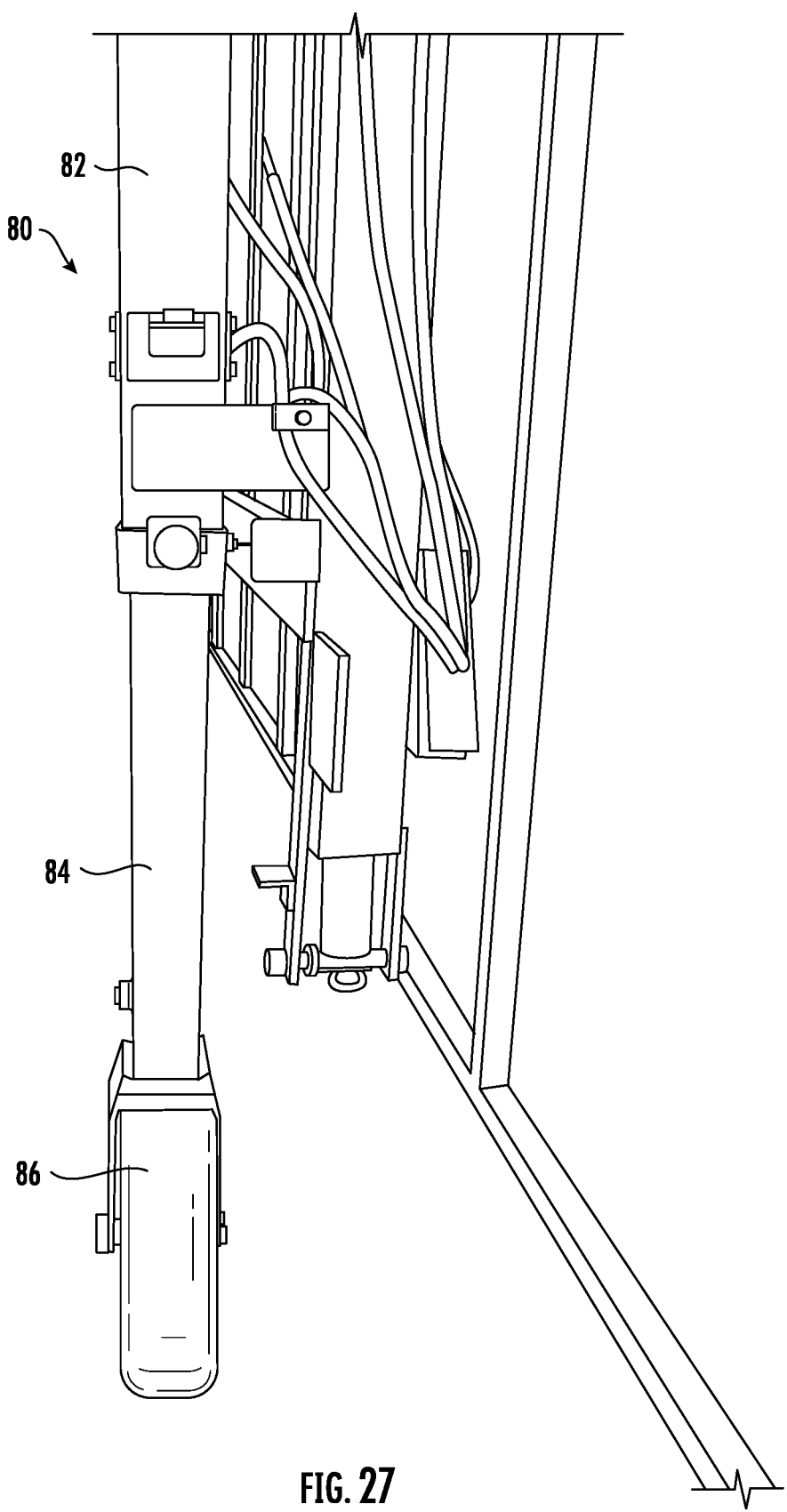
Figure 28:
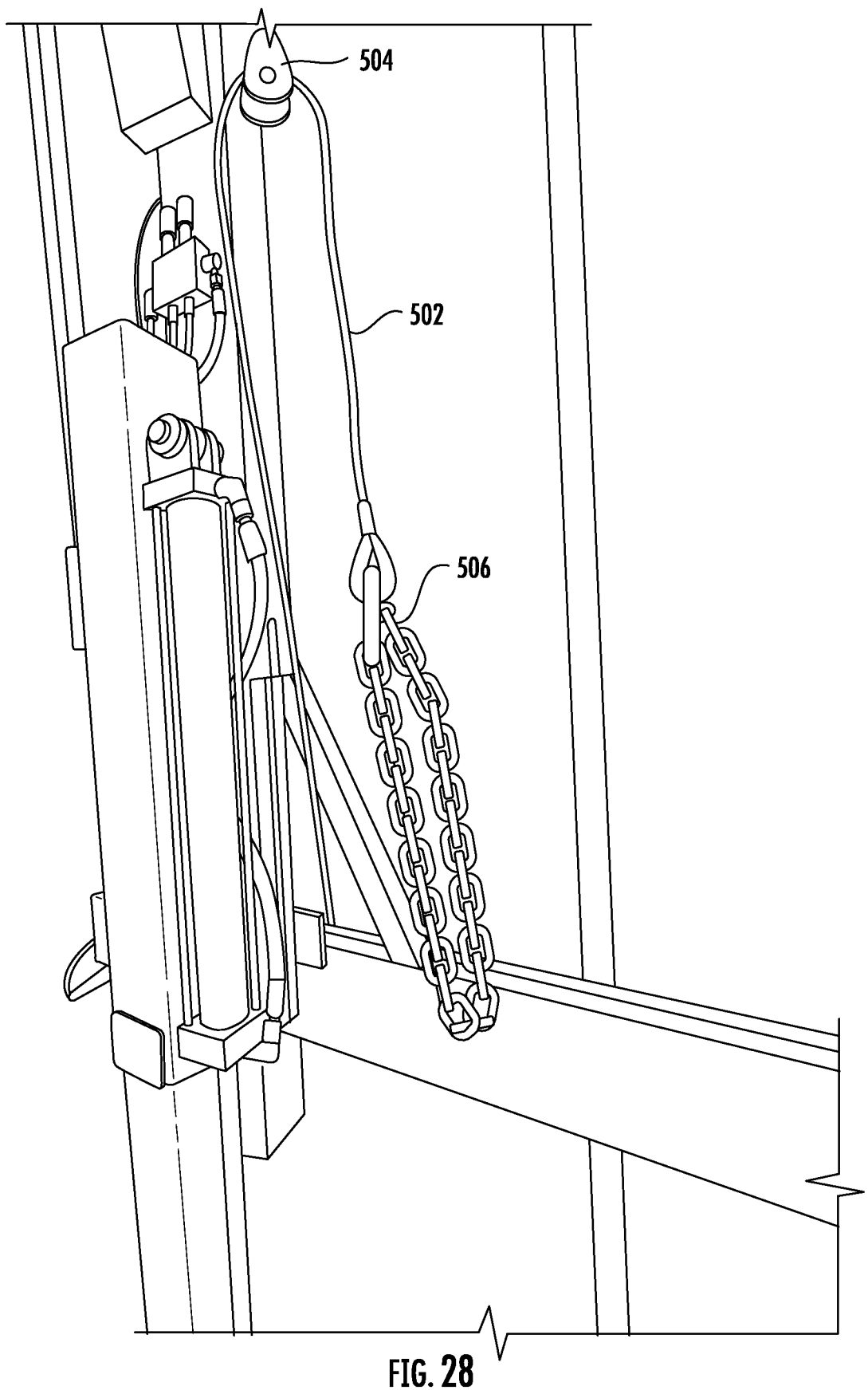
FIGS. 28-43 illustrate various views of an alternate embodiment of the container handling system.
Figure 29:
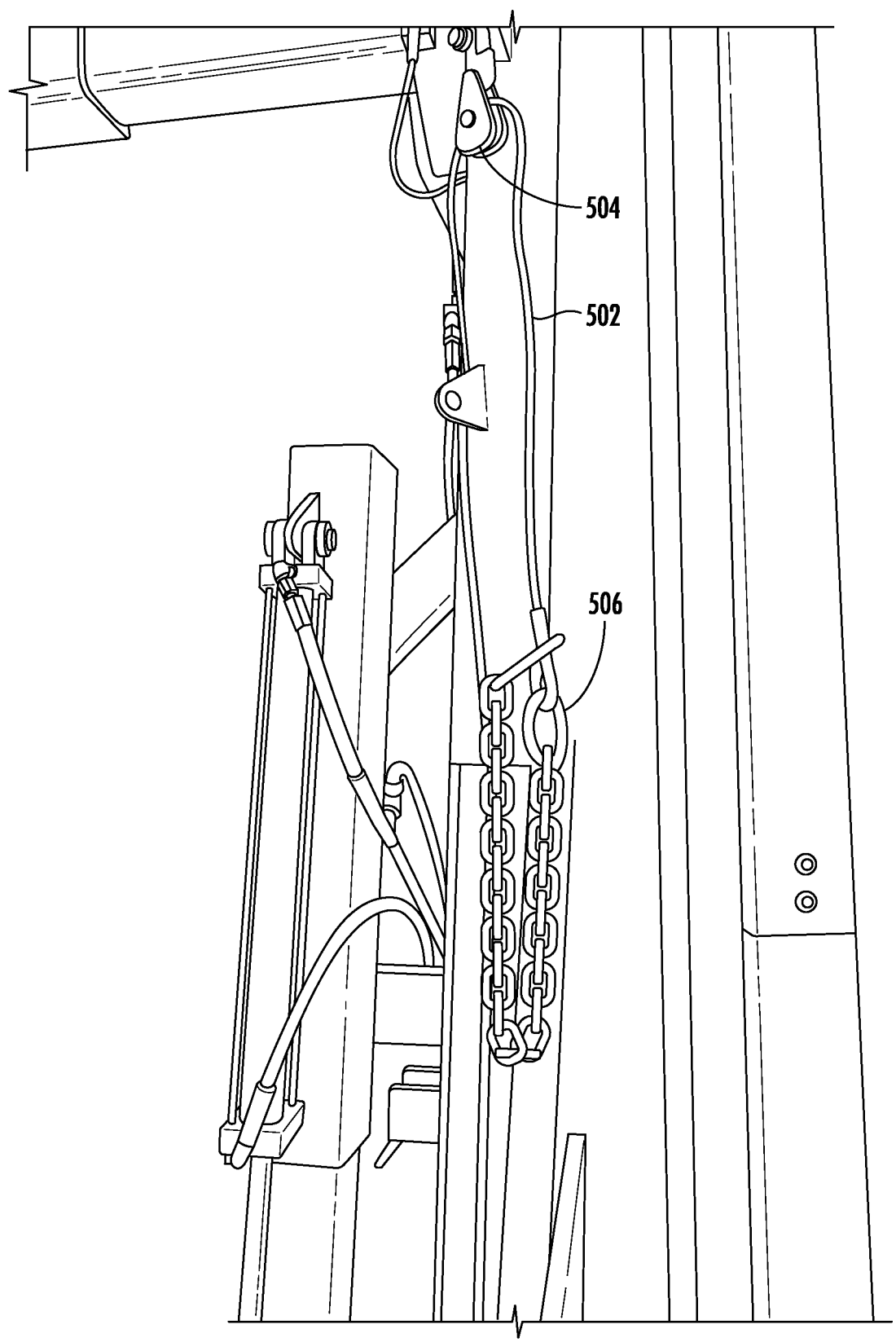
Figure 30:
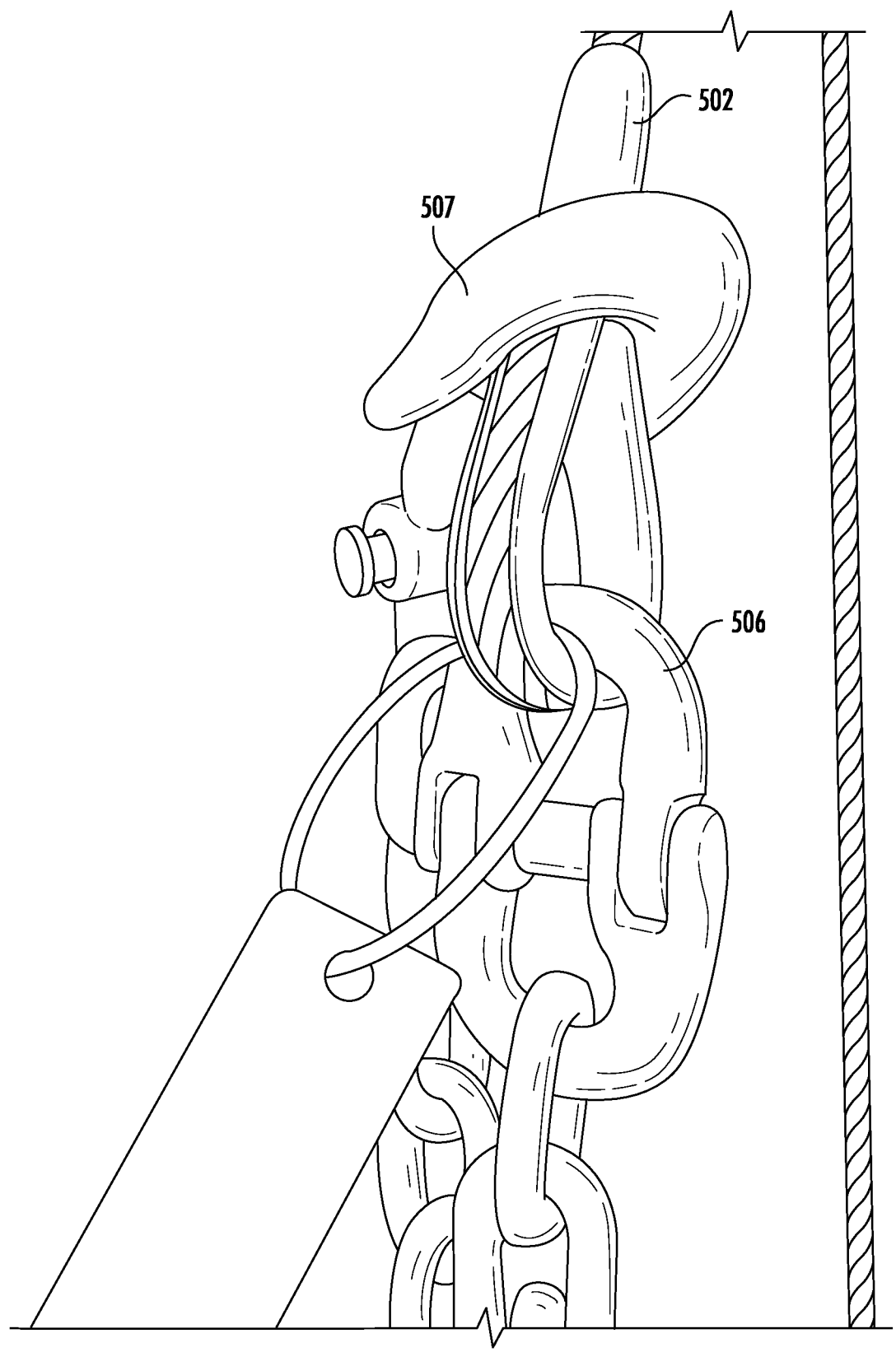
Figure 31:
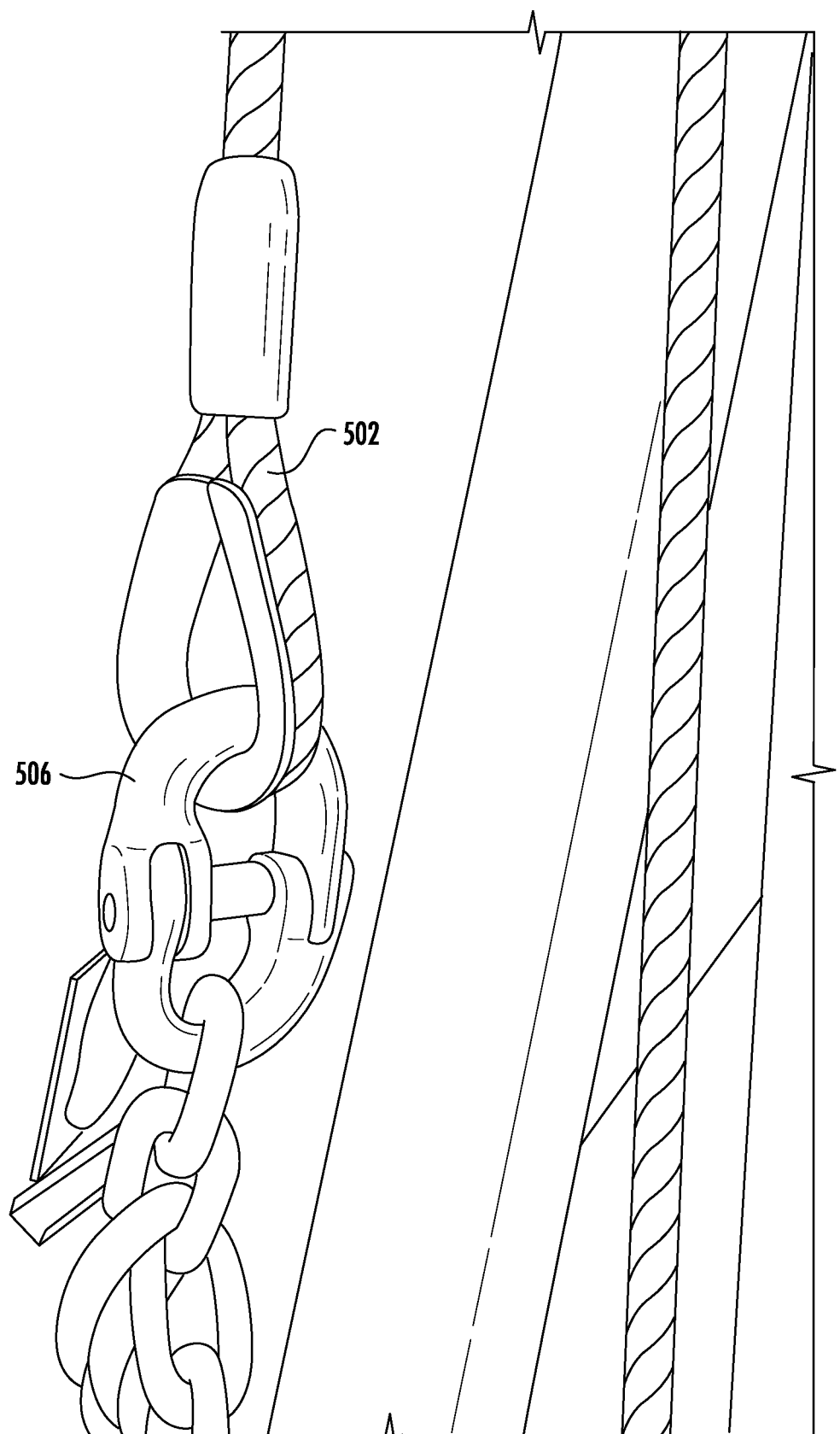
Figure 32:
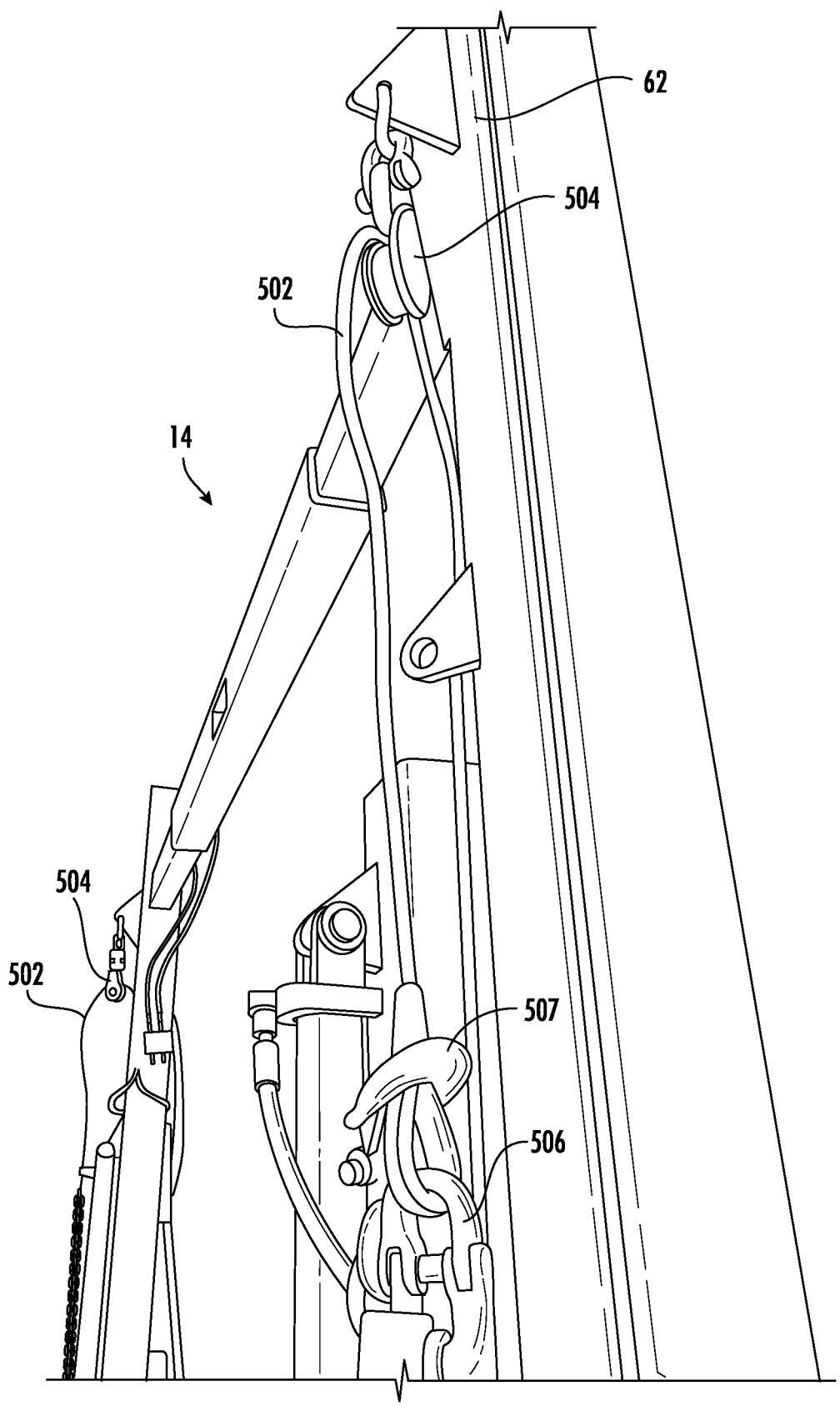
Figure 33:
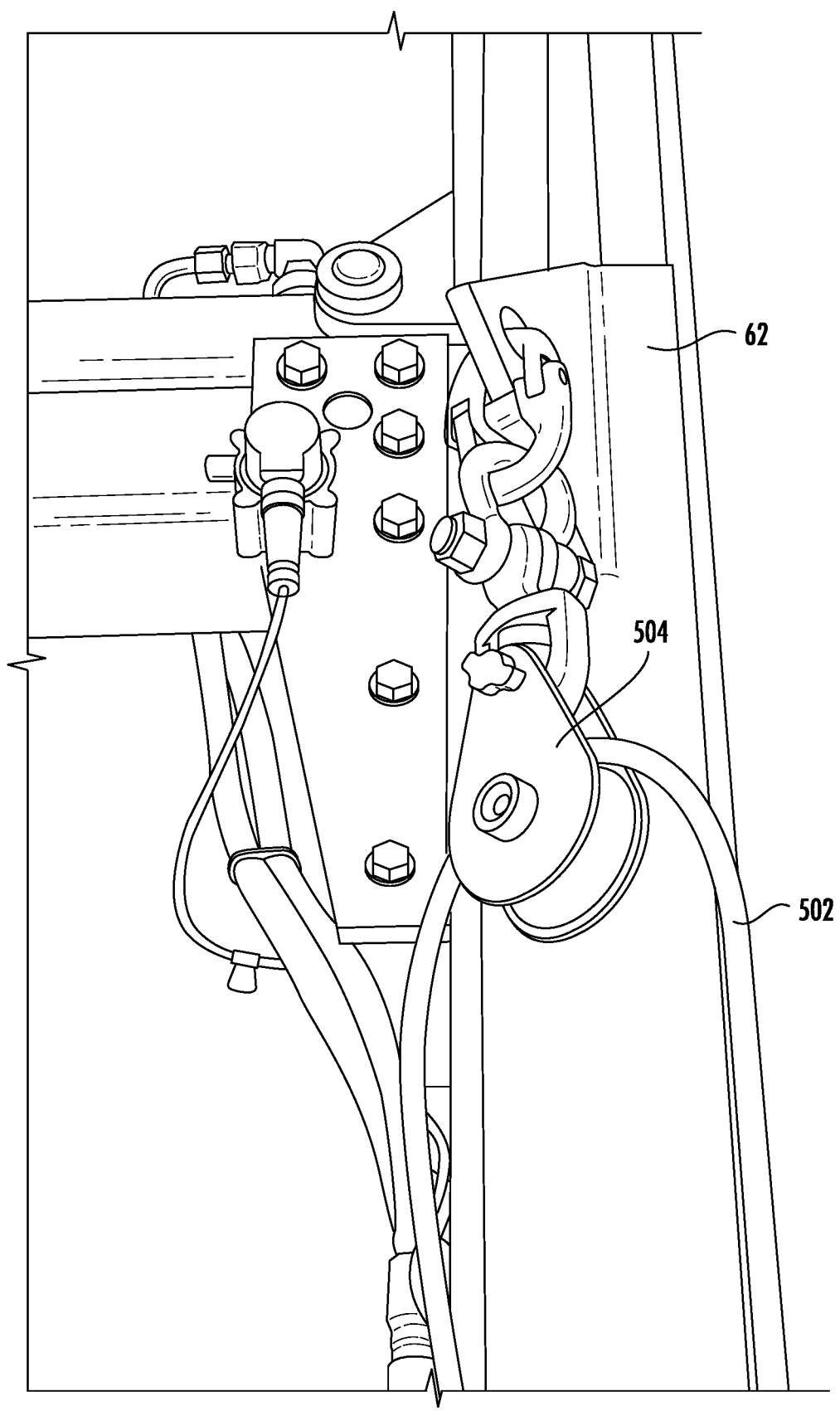

In certain embodiments, the system 10 may further include one or more independently actuatable leveling devices 80, illustrated in FIGS. 1, 2-4, 15, 17, 20-23, and 27, configured to maintain the side rails 30 generally parallel to a surface of the pickup and/or desired drop-off location as the second frame structure 14 may be moved relative to the first frame structure 12. Each of the leveling devices 80 may include a stationary member 82 fixedly coupled to an associated one of the stanchions 32, a movable member 84 in sliding engagement with the stationary member 82, and a directionally-fixed wheel 86 attached to a lower end of the movable member 84. In the embodiment shown in FIGS. 15, 17, and 20-23, a pair of wheels 86 is provided. However, more or fewer wheels can be used as desired. FIG. 27 shows a single wheel depending from a second stanchion positioned laterally inward of the stanchion 32 towards a center axis of the vehicle 100. The positioning of the second stanchion laterally inward from the stanchion 32 avoids interference with the container 2 when loading and offloading of the container 2. Additionally, it is understood that pneumatic tires, solid rubber tires, or other tire types can be used without departing from the scope of the present disclosure.

Figure 15:
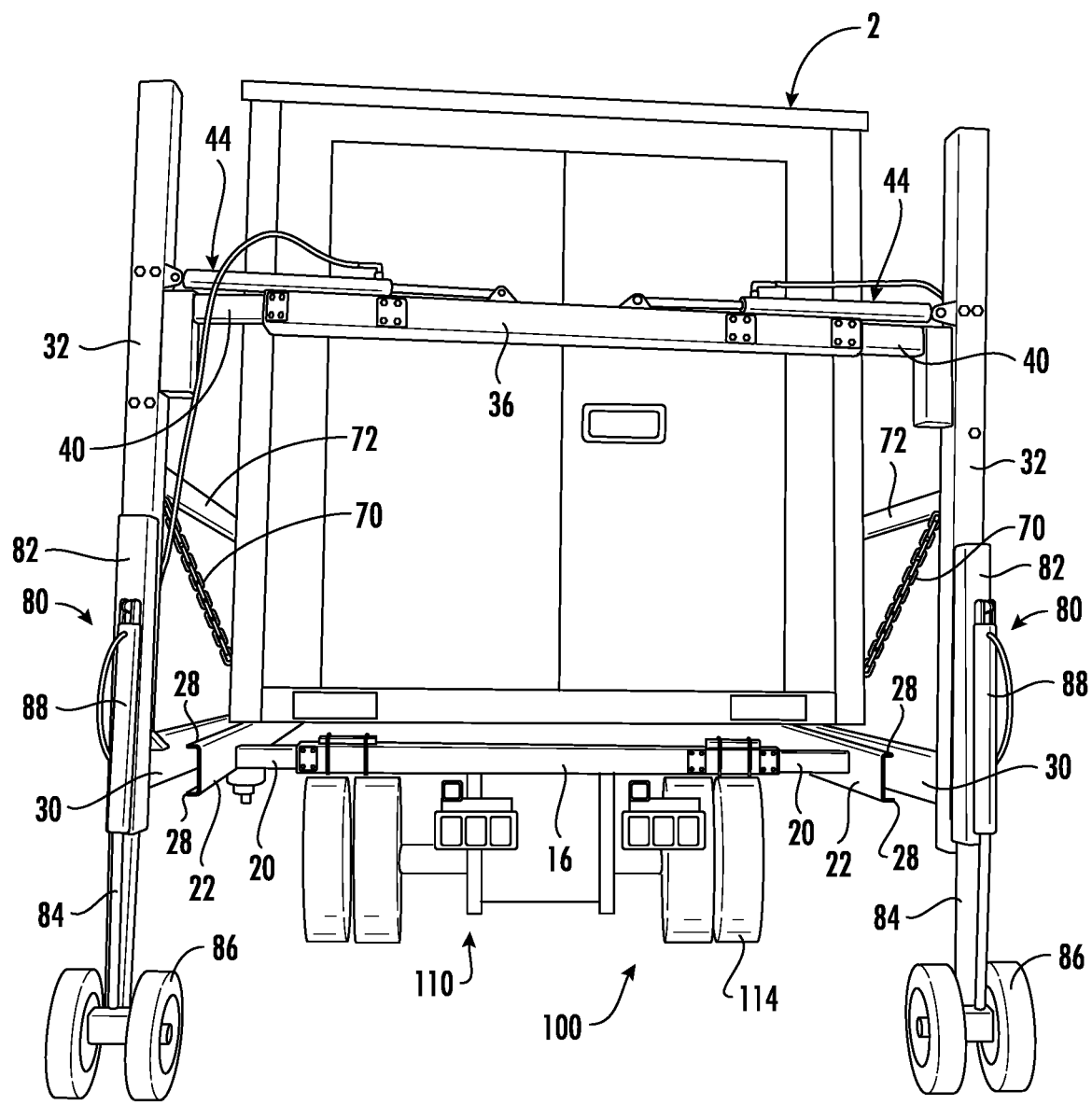
Figure 16:
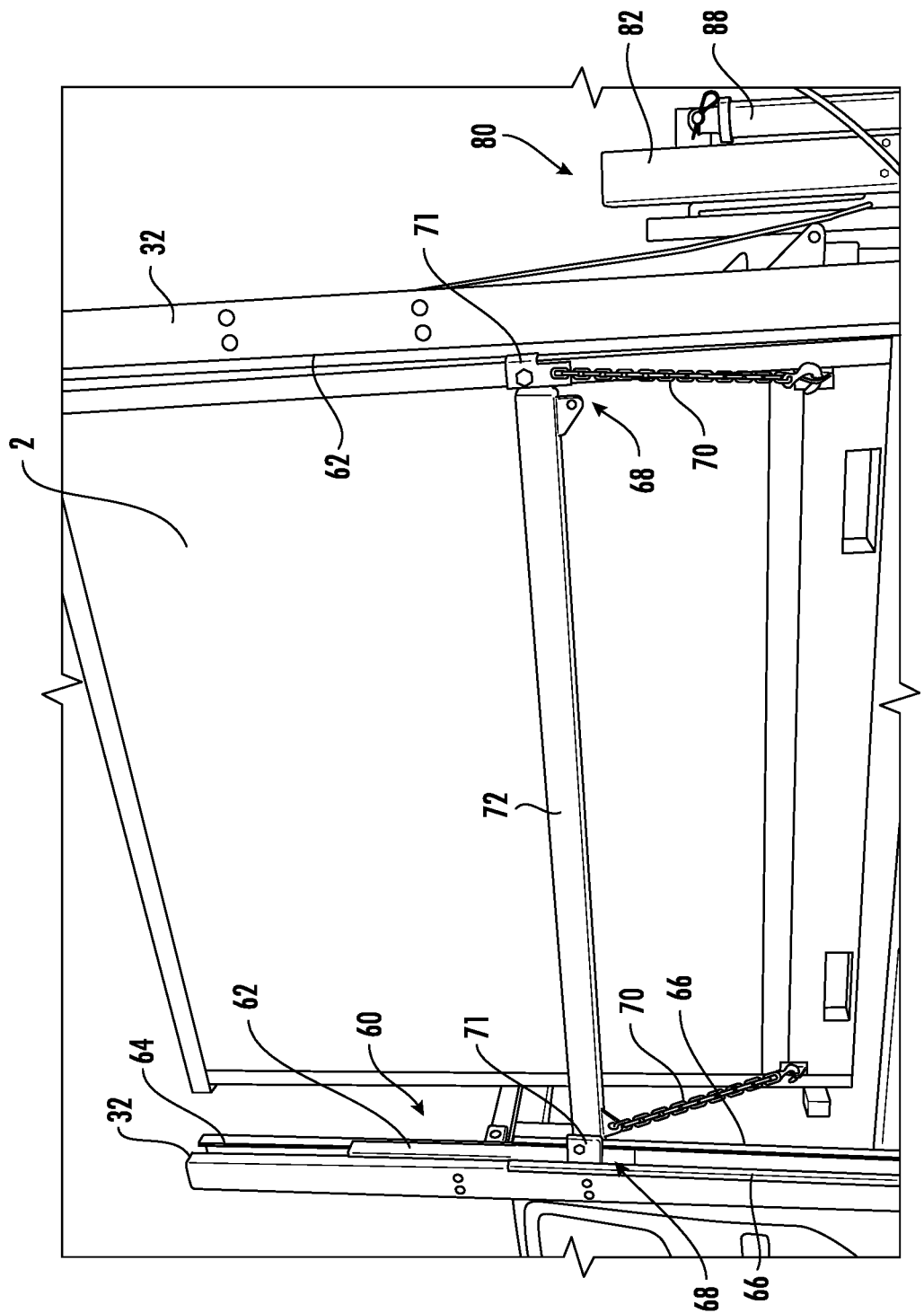
Figure 17:
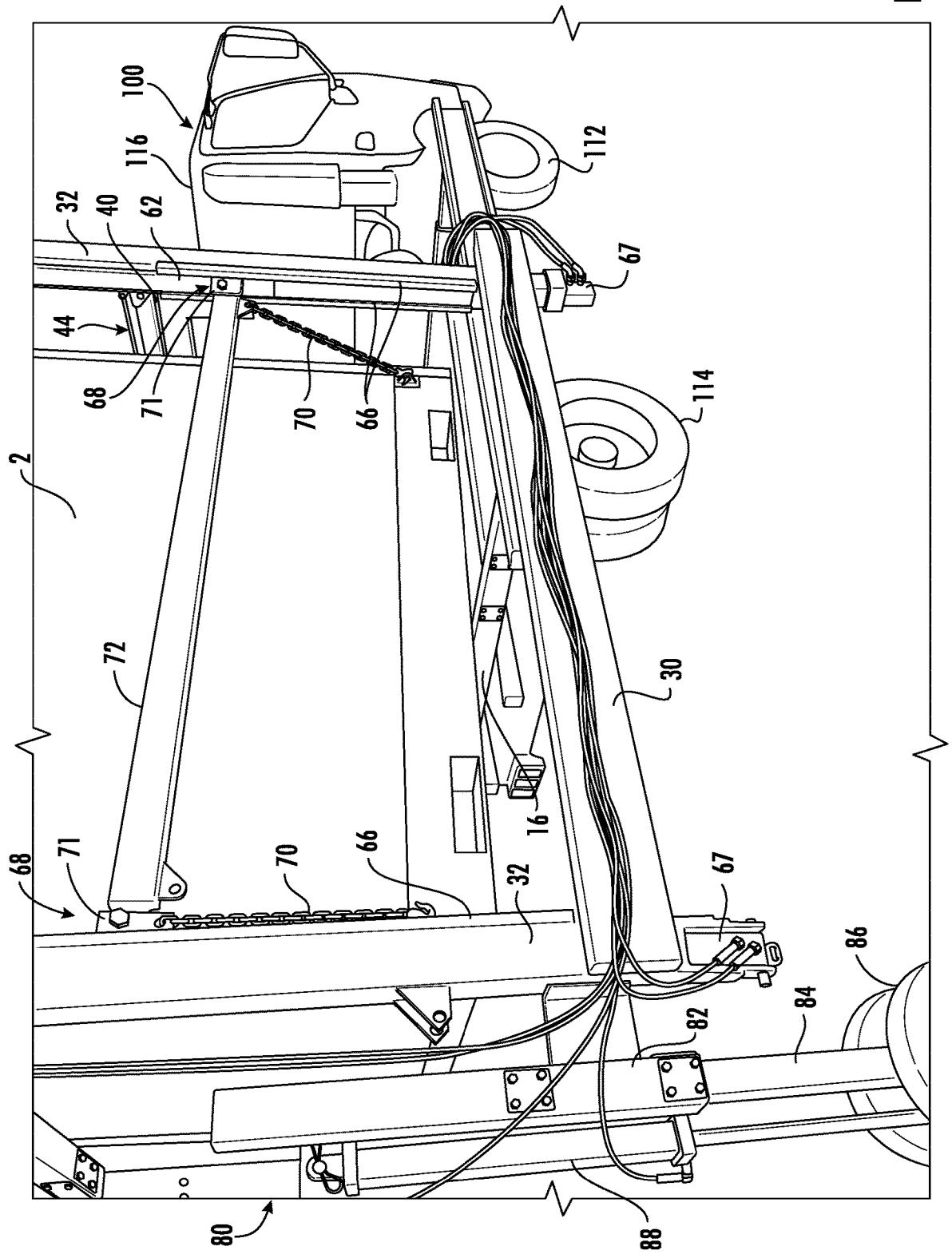
Figure 18:
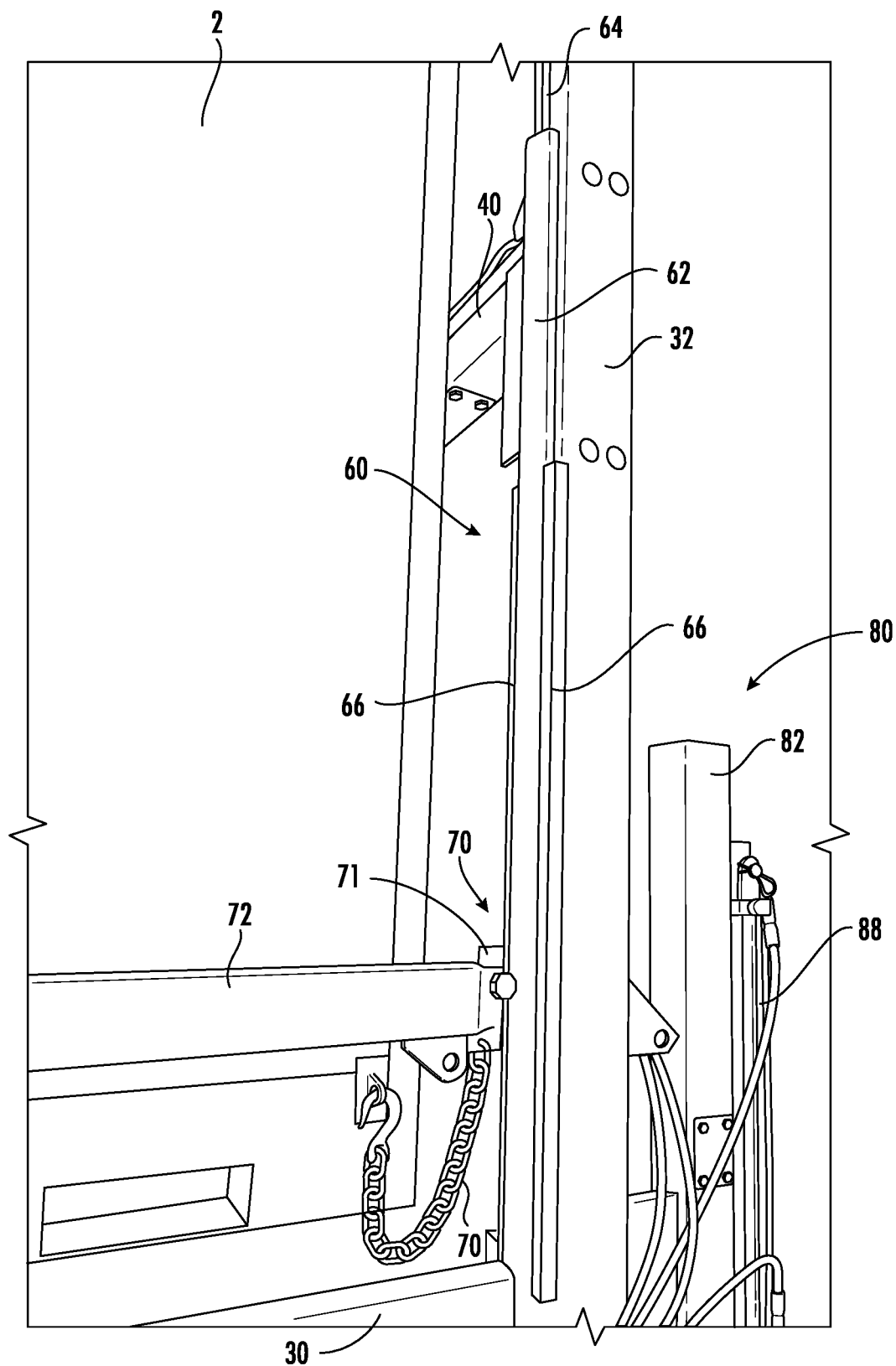
Figure 19:
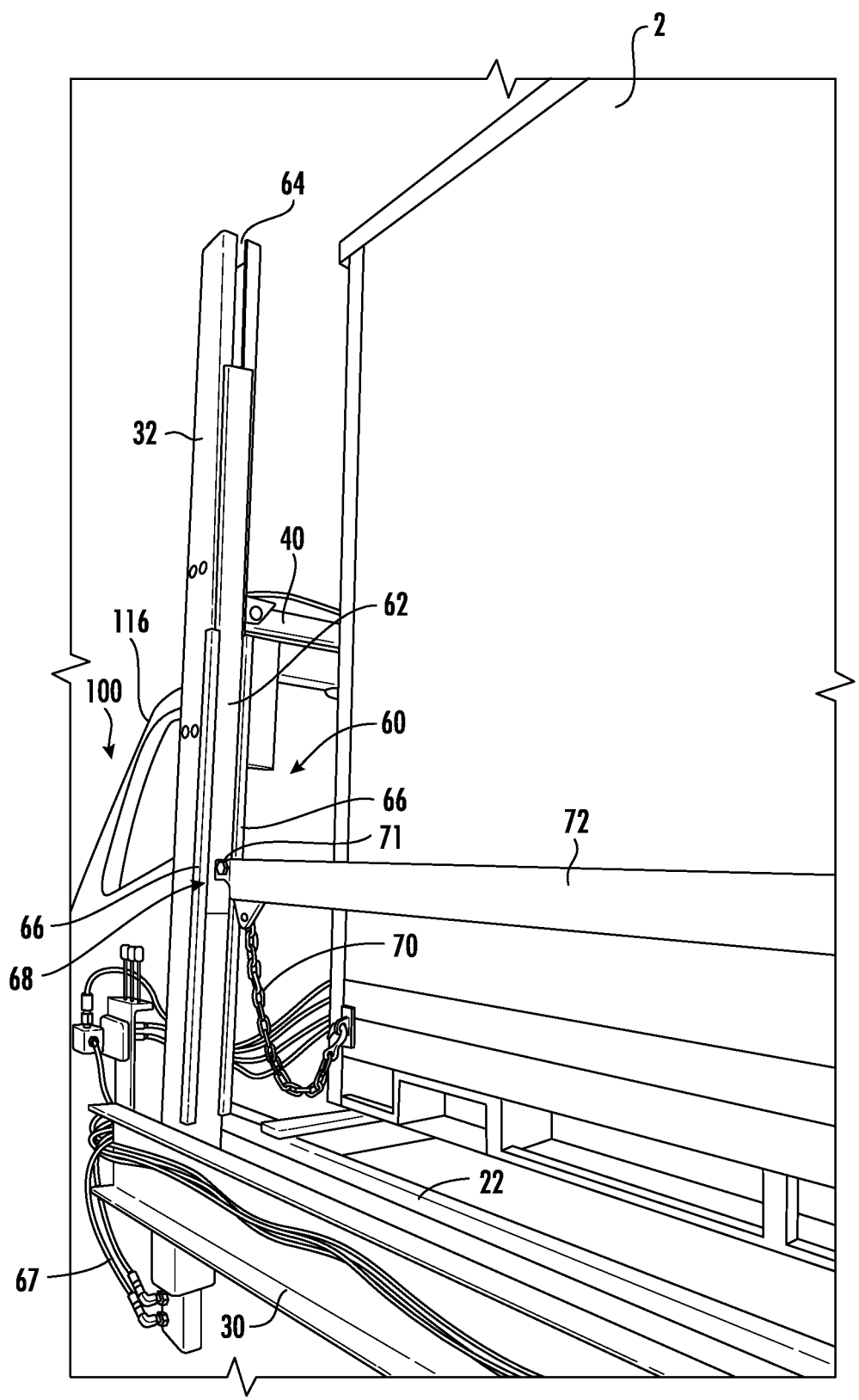
Figure 20:
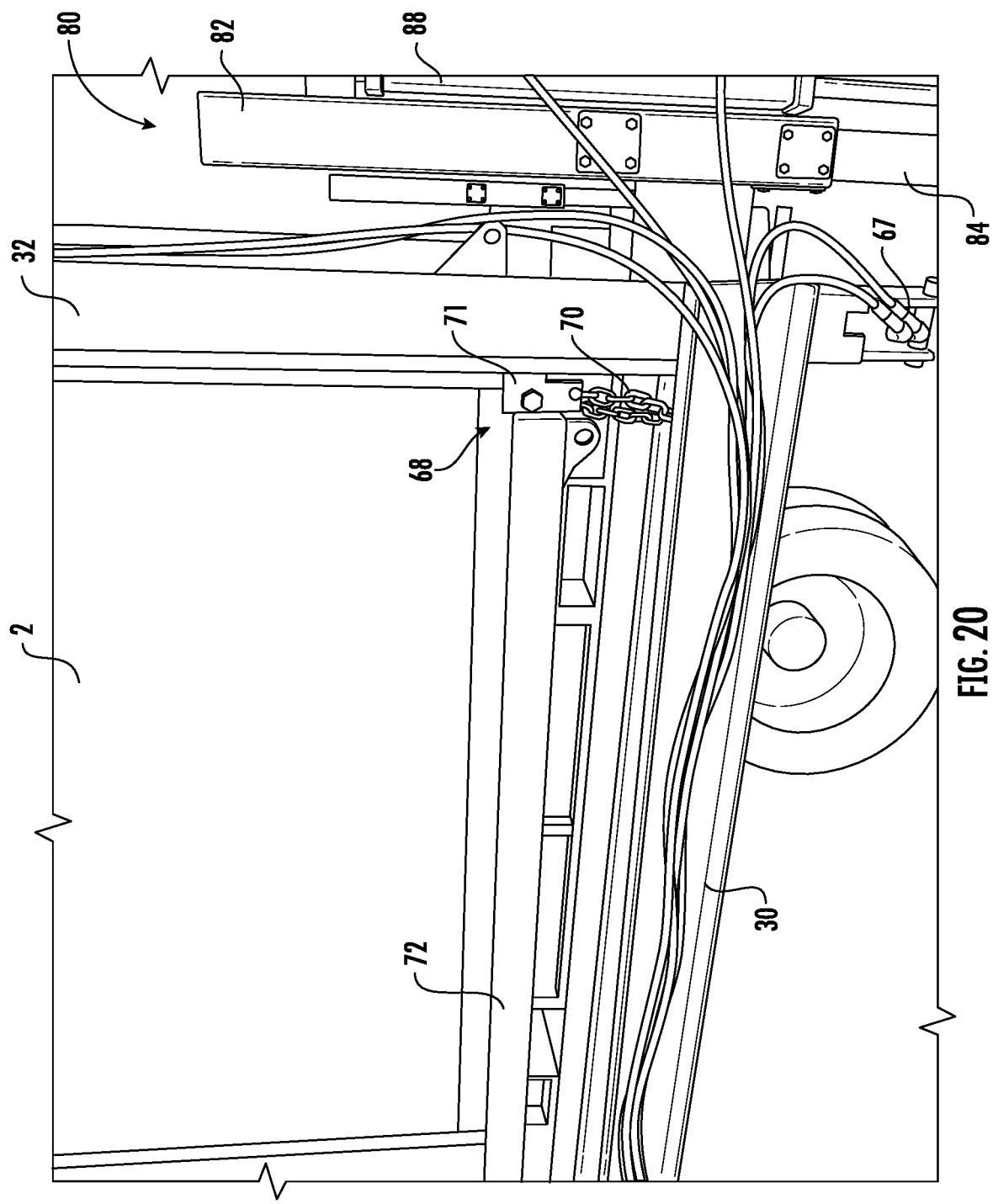
Figure 21:
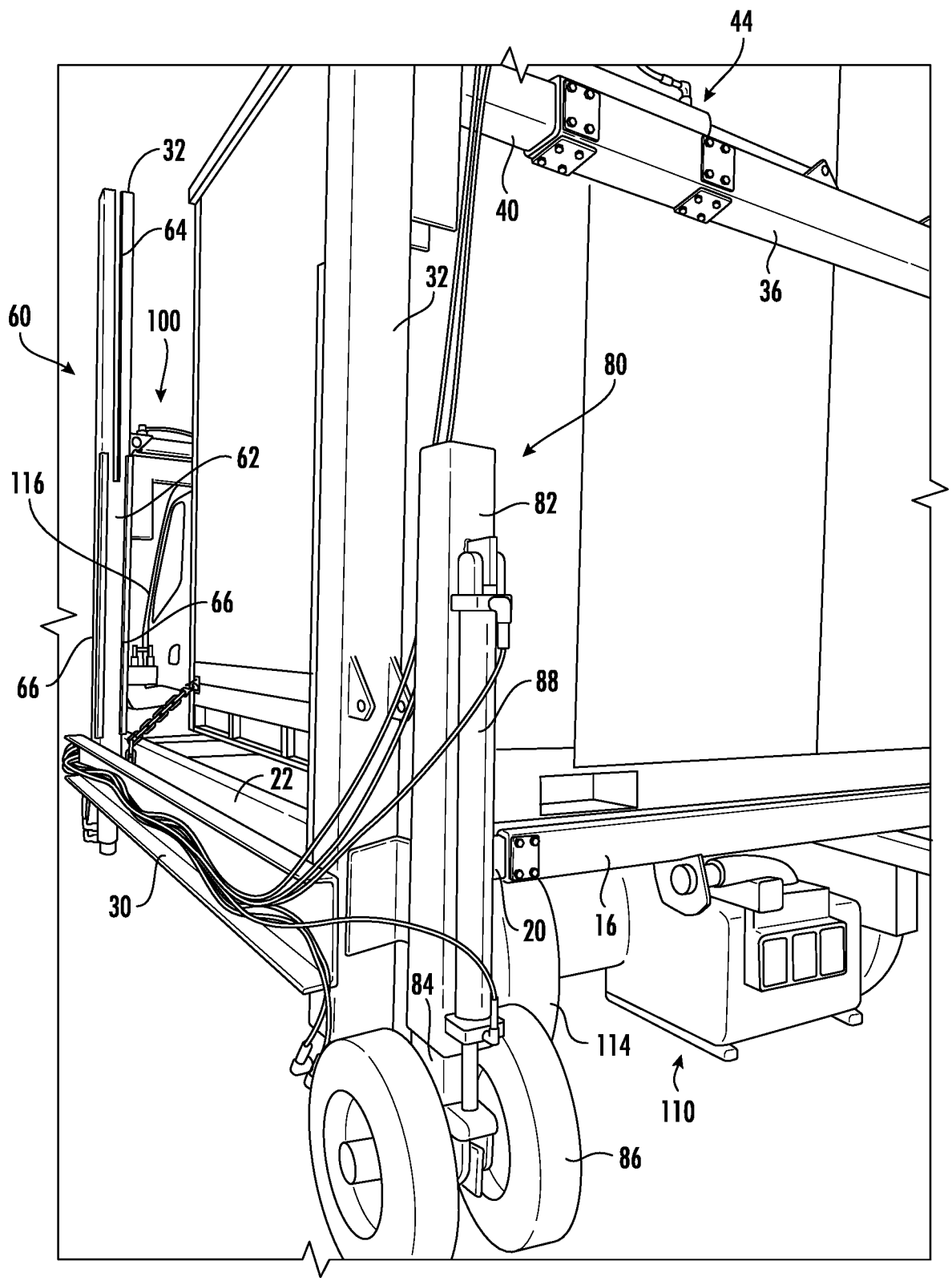

As more clearly shown in FIGS. 15 and 22, one or more actuators 88 may be employed to selectively position the movable members 84 between a retracted first position (FIG. 22) and an extended second position (FIG. 15), which in turn, causes the side rails 30 to rotate relative to the guide members 22. When in the first position, the side rails 30 may be positioned at a maximum positive angle relative to the guide members 22. Conversely, when in the second position, the side rails 30 may be positioned at a maximum negative angle relative to the guide members 22. In some embodiments, at least one of the actuators 88 employed with the leveling devices 80 may be a mechanical actuator such as a hydraulic cylinder, for example. As illustrated, a barrel with a piston of the hydraulic cylinder may be coupled to one of the stationary member 82 and an end of a piston rod connected to the piston may be coupled to a corresponding one of the moveable members 84. Various other types of actuators 88 may be used to move and position the leveling devices 80 if desired.

Figure 8:
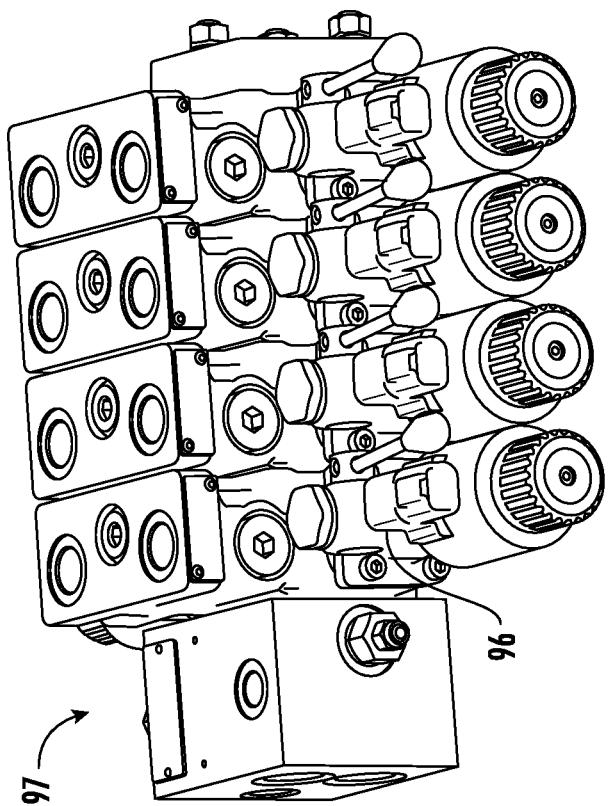
FIG. 8 is a perspective view of an exemplary valve bank assembly for the container handling system of FIG. 1.
Figure 9:
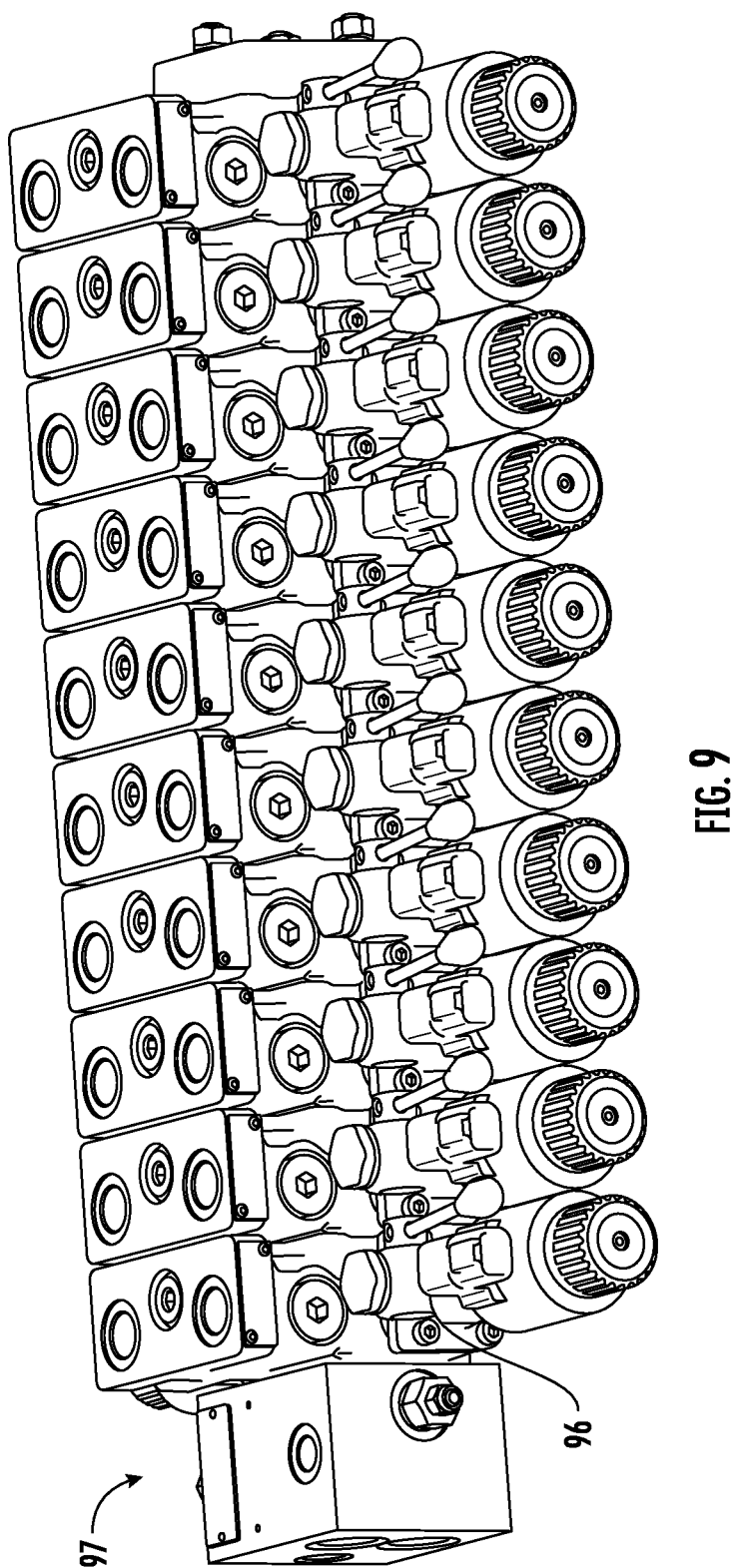
FIG. 9 is a perspective view of another exemplary valve bank assembly for the container handling system of FIG. 1.
Figure 10C:
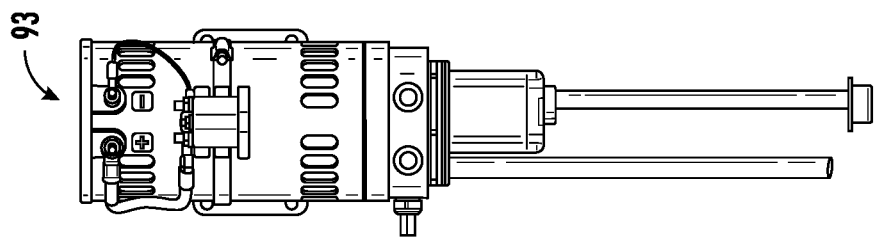
FIG. 10C is a rear elevational view of the fluid pump of FIGS. 10A and 10B, wherein a reservoir is not shown.
Figure 10B:
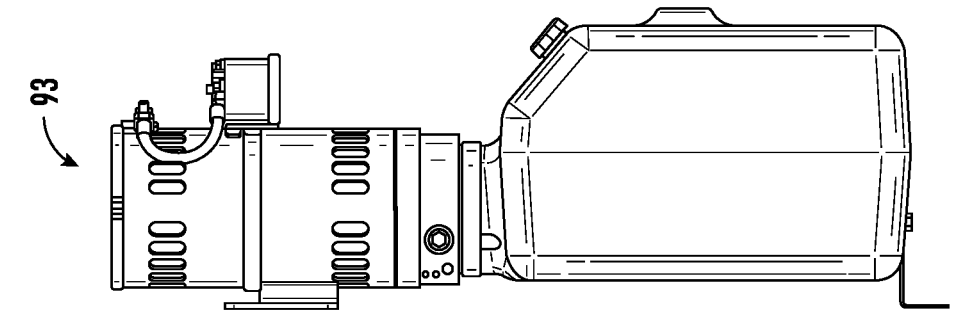
FIG. 10B is a left side elevational view of the fluid pump of FIG. 10A.
Figure 10A:
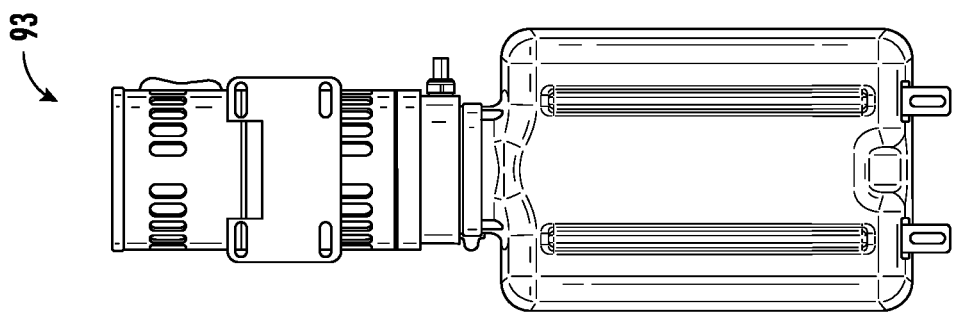
FIG. 10A is a front elevational view of an exemplary fluid pump for the container handling system of FIG. 1.
Figure 11E:
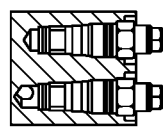
FIGS. 11A-11F illustrate an exemplary actuator for the container handling system of FIG. 1.
Figure 11F:
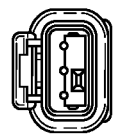
Figure 11A:
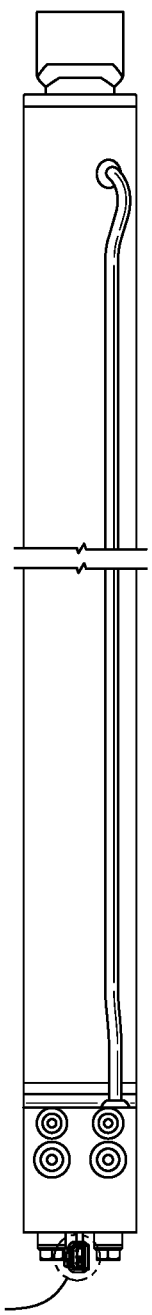
Figure 11B:
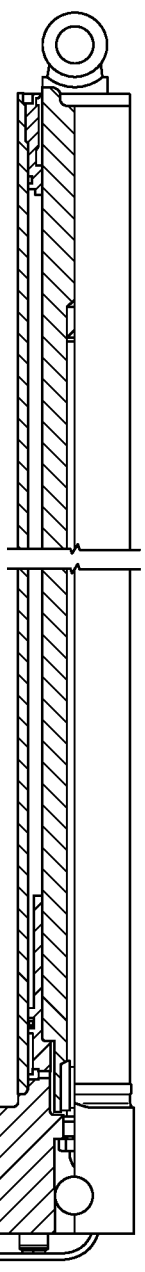
Figure 11D:
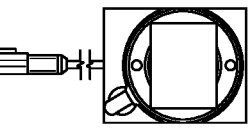
Figure 11C:
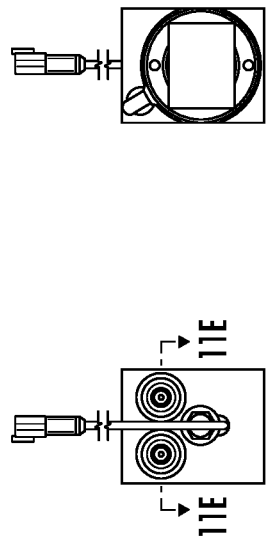

Each of the actuators 24, 44, 67, 88 and the drive assembly 50 may be in communication with a power source 90, as best seen in FIG. 13, for activation thereof. It is understood that the power source 90 may be any suitable source of power as desired. In some embodiments, the power source 90 may include hydraulic fluid system 91 comprising a fluid reservoir 92 containing a hydraulic fluid, a fluid pump 93 configured to displace the hydraulic fluid to one or more of the actuators 24, 44, 67, 88 and the drive assembly 50, and a plurality of fluid conduits 94 fluidly connecting the power source 90 to the one or more of the actuators 24, 44, 67, 88 and the drive assembly 50. In some embodiments, each of the fluid conduits 94 may be provided with one or move valves 96 and may be centrally located in a valve bank assembly 97, various exemplary embodiments of which are illustrated in FIGS. 8 and 9. FIGS. 10A-10C depict an exemplary embodiment of the fluid pump 93.

A controller (not depicted) may be in communication with the hydraulic fluid system 91 to permit manual, semi-automatic, and/or fully automatic control of the system 10 and/or the transport vehicle 100. In certain embodiments, system 10 including the controller may be configured to permit the system 10 to operate with minimal human interaction. For example, the system 10 including the controller may be configured to eliminate the need for the user to connect and/or disconnect the restraints 70 to the container 2 such that the user may be only required to simply "push a button" to load and/or unload the container 2 onto and from the transport vehicle 100. In other embodiments, the system 10 including the controller may be configured to permit the system 10 and the transport vehicle 100 to operate autonomously. For example, the user may identify the pickup location and the drop-off location using an identifier (e.g. a wireless marker or using a mobile application), and the transport vehicle 100 including the system 10 may then be dispatched from a hub location to load, unload, and transport the container 2 without the presence and/or assistance of the user.

The controller may be located in the cab 116 of the transport vehicle 100. The controller may be in communication with a human-machine interface (not depicted) and configured to prompt the user of the system 10 to input a response to one or more queries (i.e. safety questions) prior to, during, and/or after operation of the system 10. In one embodiment, the controller may also be configured to control a rate and an amount of flow of the hydraulic fluid from the fluid reservoir 92 to the each of the actuators 24, 44, 67, 88 and the drive assembly 50. Accordingly, the controller may be able to precisely move and position the members 20, 22, 40, 62, 84, the side rails 30, and/or the stanchions 32 of the respective frame structures 12, 14, and thereby control a balance and/or an alignment of the container 2 during the loading, the unloading, and/or the transport thereof. One or more positional sensors (not depicted), in communication with the controller, may also be employed in the system 10 to detect a misalignment of the container 2 during the loading, the unloading, and/or the transport thereof.

Each of the actuators 24, 44, 67, 88 and the drive assembly 50 may further include one or more pressure sensors (not depicted) in communication with the controller. The pressure sensors may be employed in the system 10 to detect a load on each of the actuators 24, 44, 67, 88 and the drive assembly 50. In the event of an "overload" of one or more the actuators 24, 44, 67, 88 and the drive assembly 50, the system 10 may cease operations. One or move valves may also be employed with each of the actuators 24, 44, 67, 88, various exemplary embodiments of which are illustrated in FIGS. 11A-F and 12A-F, and the drive assembly 50 to militate against an undesired lowering or a "drop" of the container 2 in the event of a sudden and unexpected decrease in pressure in the hydraulic fluid system 91 such as by a failure of one of the fluid conduits 94, for example.

Various reinforcement elements (not depicted) may be disposed on one or more of the members 16, 20, 22, 36, 40, 62, 72, 84, the side rails 30, and/or the stanchions 32 of the respective frame structures 12, 14 to provide additional strength and support thereto, especially during the loading, the unloading, and/or the transporting of the container 2.

During the loading of the container 2, the transport vehicle 100 may be maneuvered such that the container 2, disposed at the pickup location, may be positioned adjacent a rear of the transport vehicle 100. Once the transport vehicle 100 is properly positioned, the actuators 24 are activated causing the movable members 20 of the first frame structure 12 to move from the first position to one of the second position or an intermediate position between the first and second positions thereof, thereby causing the guide members 22 to move from the first position to one of the second position thereof or an intermediate position between the first and second positions thereof such that a distance between the side rails 30 may be sufficient to accommodate the container 2. Simultaneously, the actuators 44 are activated causing the movable members 40 of the second frame structure 14 to move from the first position to one of the second position or an intermediate position between the first and second positions thereof, thereby causing the stanchions 32 and the side rails 30 coupled thereto to move from the first position to one of the second position thereof or an intermediate position between the first and second positions thereof such that a distance between the stanchions 32 and the side rails 30 may be sufficient to accommodate the container 2. The actuators 67 may also be activated to cause the movable members 62 of the handling device 60 to move from the first position to one of the second position thereof or an intermediate position between the first and second positions thereof such that the cross-members 36 and movable members 40 of the second frame structure 14 clear a top of the container 2. The actuators 88 may also be activated to cause the movable members 84 of the leveling device 80 to move from the first position to one of the second position thereof or an intermediate position between the first and second positions thereof such that the side rails 30 rotate relative to the guide members 22 so as to maintain the side rails 30 generally parallel to a surface, especially an irregular surface, of the pickup location.

Thereafter, the drive mechanism 52 may be activated causing the second frame structure 14 to extend and move rearwardly in the longitudinal direction relative to the first frame structure 12 away from the chassis 110 of the transport vehicle 100 until the stanchions 32 generally correspond to corners of the container 2. More particularly, the drive mechanism 52 causes the side rails 30 to move rearwardly in the longitudinal direction relative to the guide members 22. Simultaneously, the actuators 88 may also be activated to cause the movable members 84 of the leveling device 80 to continue to move between the second position and the intermediate position thereof such that the side rails 30 may further rotate relative to the guide members 22 so as to continue to maintain the side rails 30 generally parallel to the surface, especially the irregular surface, of the pickup location as the second frame structure 13 may be moved relative to the first frame structure 12.

Once the second frame structure 14 is in position around the container 2, the actuators 67 may be activated to cause the movable members 62 of the handling device 60 to move from one of the second position and the intermediate position to the first position so as to lower the second frame structure 14 such that the restraints 70 may be connected to the container 2. If necessary, the actuators 88 may also be activated to cause the movable members 84 of the leveling device 80 to retract such that the restraints 70 may be positioned in closer proximity to the container 2.

Upon connection of the restraints 70 to the container 2, the actuators 67 may then be activated again to cause the movable members 62 of the handling device 60 to move from the first position to one of the second position and the intermediate position so as to raise the second frame structure 14, and thereby the container 2, toward an upper end of the stanchions 32. At the same times, the actuators 88 may also be activated to cause the movable member 84 of the leveling device 80 to extend such that the side rails 30 remain parallel to the surface of the pickup location.

Once the container 2 may be raised sufficiently above a horizontal plane defined by the chassis 110 of the transport vehicle 100, the drive mechanism 52 may be activated causing the second frame structure 14 to retract and move forwardly in the longitudinal direction relative to the first frame structure 12 towards the chassis 110 of the transport vehicle 100 until the container 2 is properly positioned above the chassis 110. More particularly, the drive mechanism 52 causes the side rails 30 to move forwardly in the longitudinal direction relative to the guide members 22. Simultaneously, the actuators 88 may also be activated to cause the movable members 84 of the leveling device 80 to continue to move between the second position and the intermediate position thereof such that the side rails 30 may further rotate relative to the guide members 22 so as to continue to maintain the side rails 30 generally parallel to the guide members 22 as the second frame structure 13 may be moved relative to the first frame structure 12.

Once the container 2 is in place over the chassis 110, the second frame structure 14 may be lowered from one of the second position and the intermediate position to the first position thereof so as to dispose the container 2 on the chassis 110 such that the container 2 may be supported by at least one of the rails 120 of the chassis 110 and the support members 122 of the support structure 118. More particularly, the container 2 may be lowered by activating the actuators 67 to cause the movable members 62 of the handling device 60 to move from one of the second position and the intermediate position to the first position thereof.

Once the transport vehicle 100 may be properly positioned, the actuators 24 may be activated causing the movable members 20 of the first frame structure 12 to move from one of the second position and the intermediate position to the first position, thereby causing the guide members 22 of the second frame structure 14 to move from one of the second position and the intermediate position to the first position. Simultaneously, the actuators 44 may be activated causing the movable members 40 of the second frame structure 14 to move from one of the second position and the intermediate position to the first position, thereby causing the stanchions 32 and the side rails 30 coupled thereto to move from one of the second position and the intermediate position to the first position. The actuators 88 may also be activated to cause the movable members 84 of the leveling device 80 to move from one of the second position and the intermediate position to the first position. The container 2 may then be capable of being transported by the transport vehicle 100. Deployment of the container 2 may be further accomplished by generally reversing the steps of the described loading operation and thus is not explicitly described herein.

Figure 34:
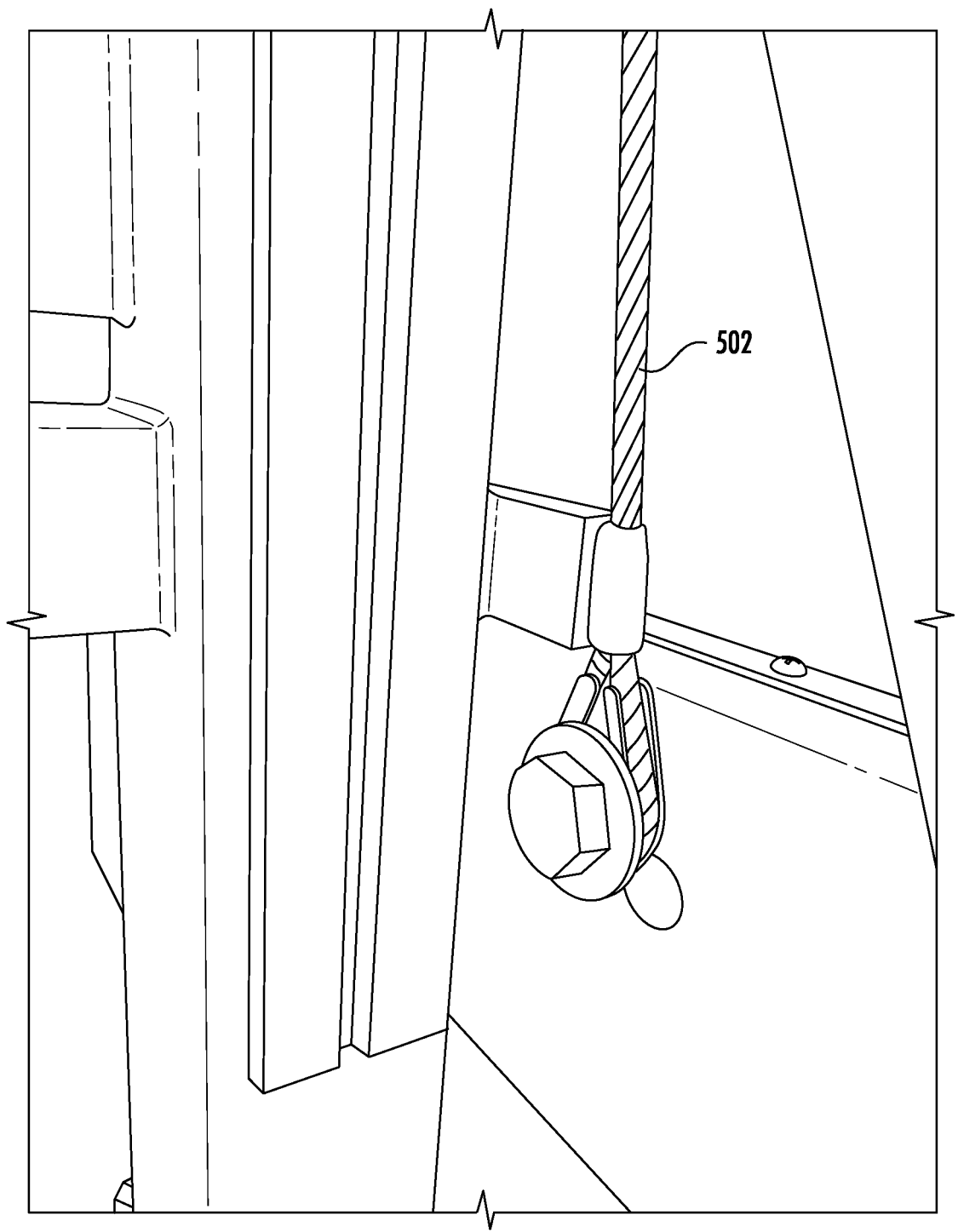
Figure 35:
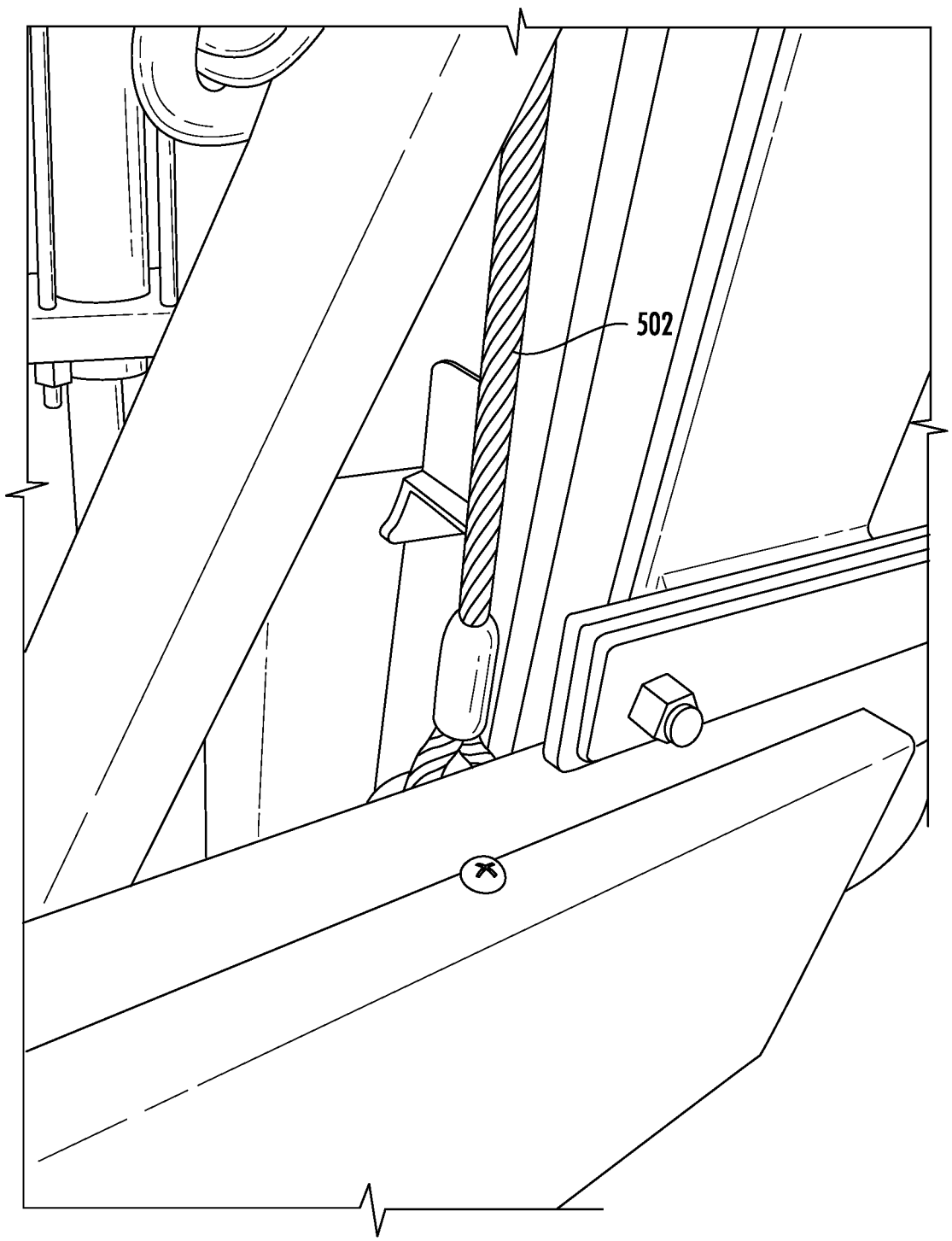
Figure 36:
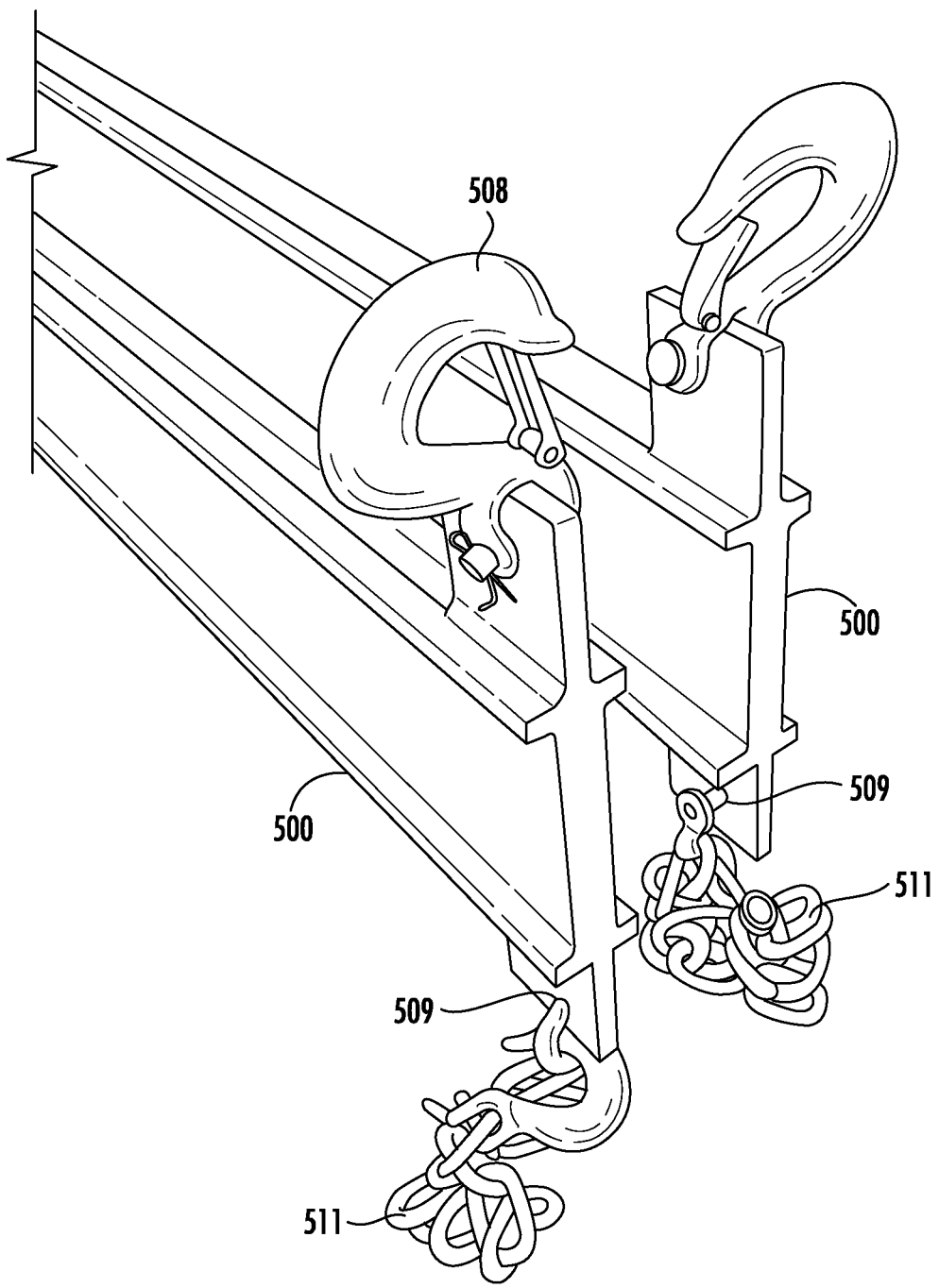
Figure 40:
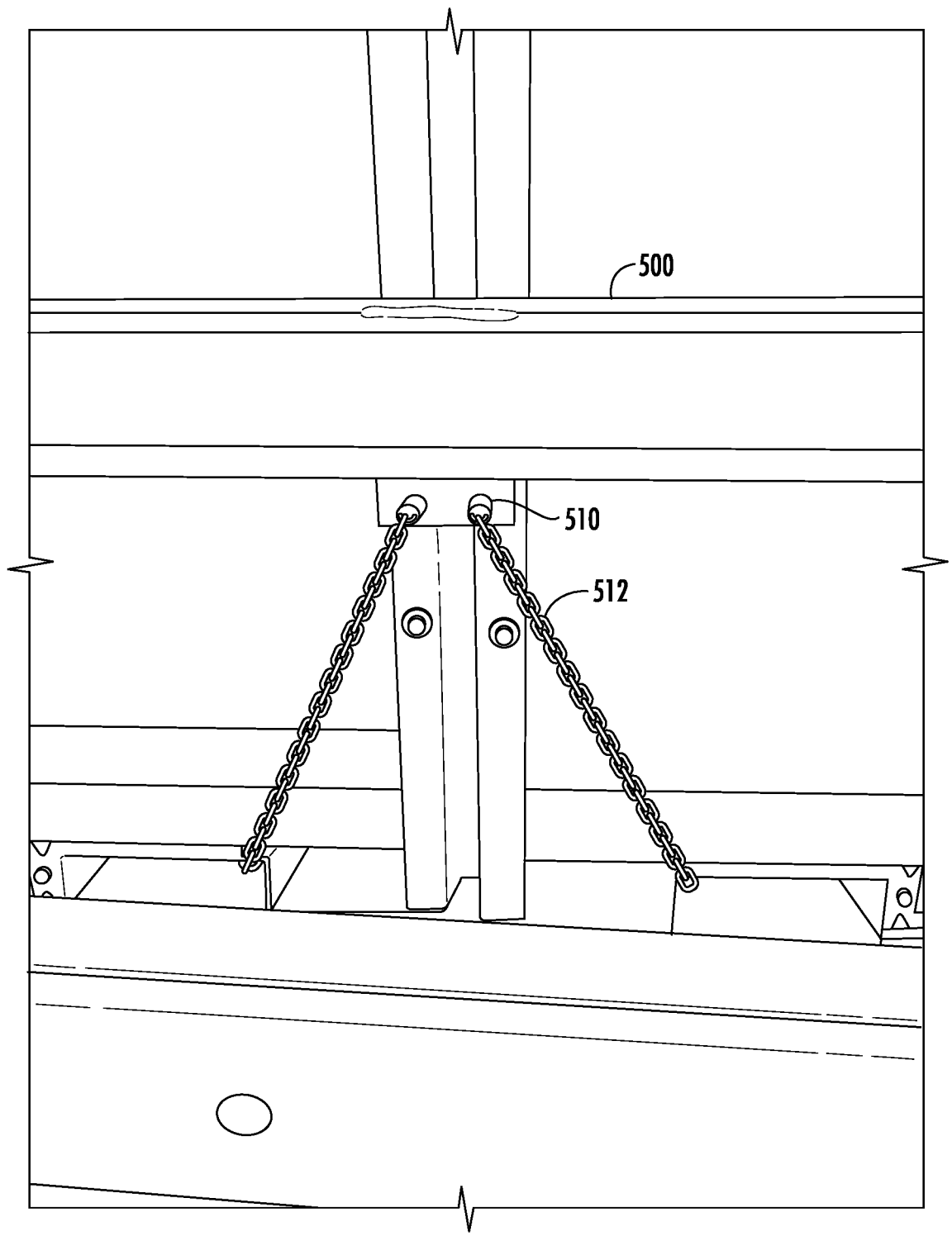
Figure 41:
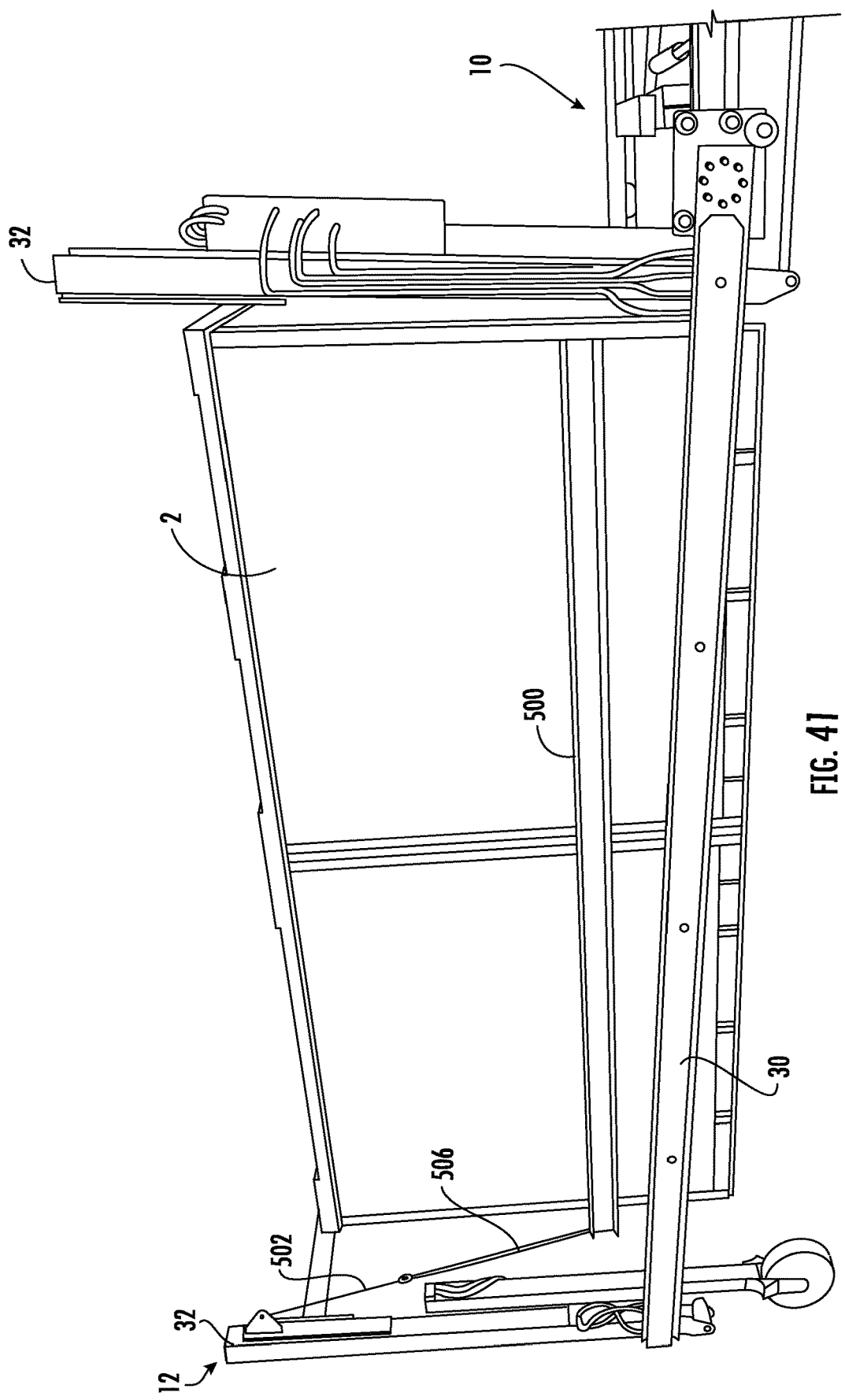

In another embodiment shown in FIGS. 29-41, a vertically restrained cross-member 500 is provided on opposing sides of the system 10 between a front one of the stanchions 32 and a rear one of the stanchions 32. As shown, each end of the cross-member 500 can be suspended by a cable 502 and/or chain. However, it is understood that other structures can be used to support the cross-member 500. A first end of the cable 502 can be fixedly attached to a horizontal frame member as part of the second frame structure 14 as best seen in FIGS. 34 and 35. An intermediate portion of the cable 502 is fed through a pulley 504 as shown in FIGS. 28, 29, 32, and 33. The pulley 504 is supported by the movable member 62 portion of the stanchion 32. A second end of the cable 502 includes a clasp or other releasable fastening structure for directly connecting to the cross-member 500 or a first end of a chain 506 as shown in FIGS. 28-32 and 41. If connected to the first end of the chain 506, the second end of the chain 506 is connected to the cross-member 500 via a clasp 507 or other releasable fastening structure as shown in FIG. 41.

Figure 37:
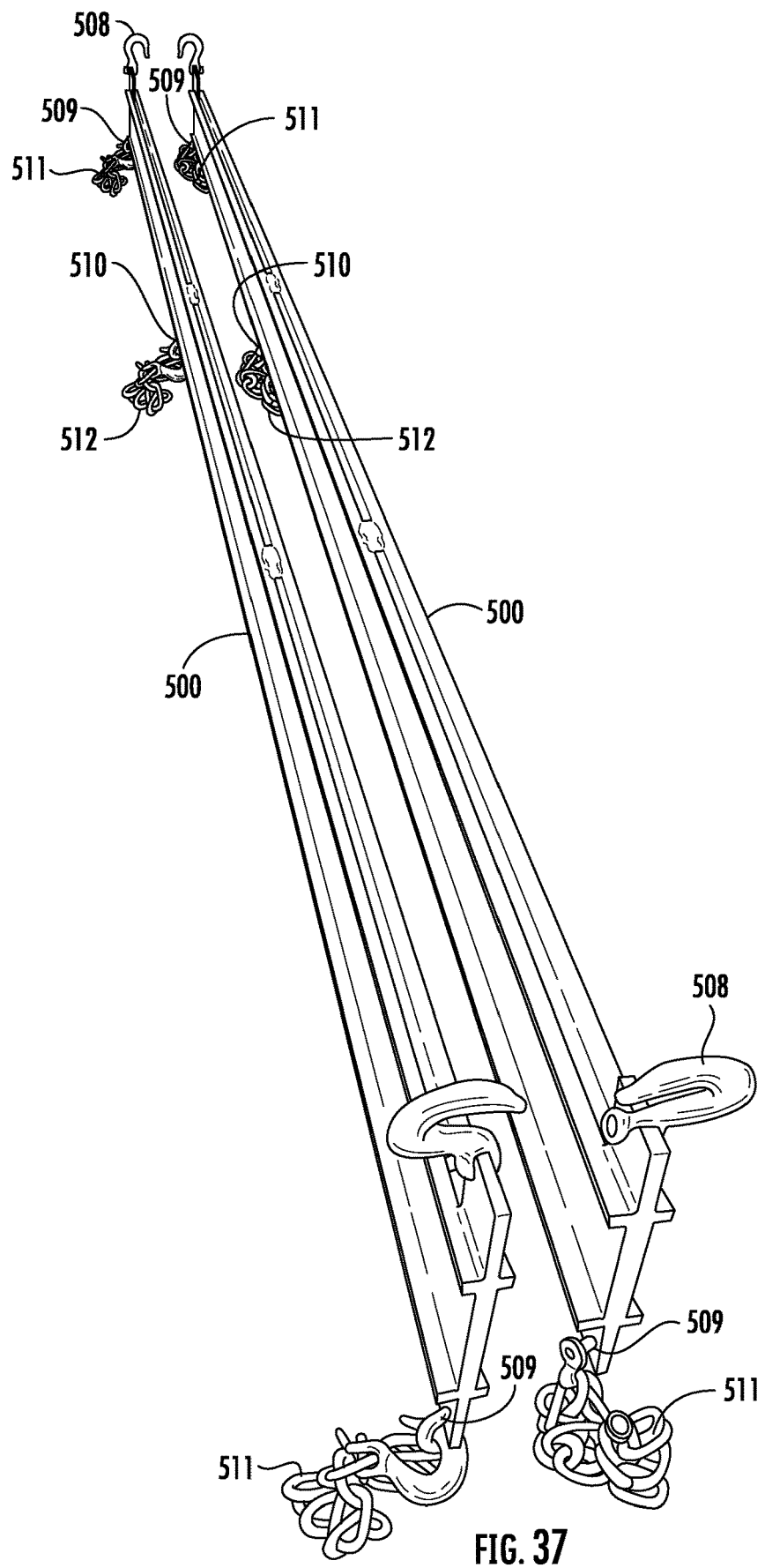
Figure 38:
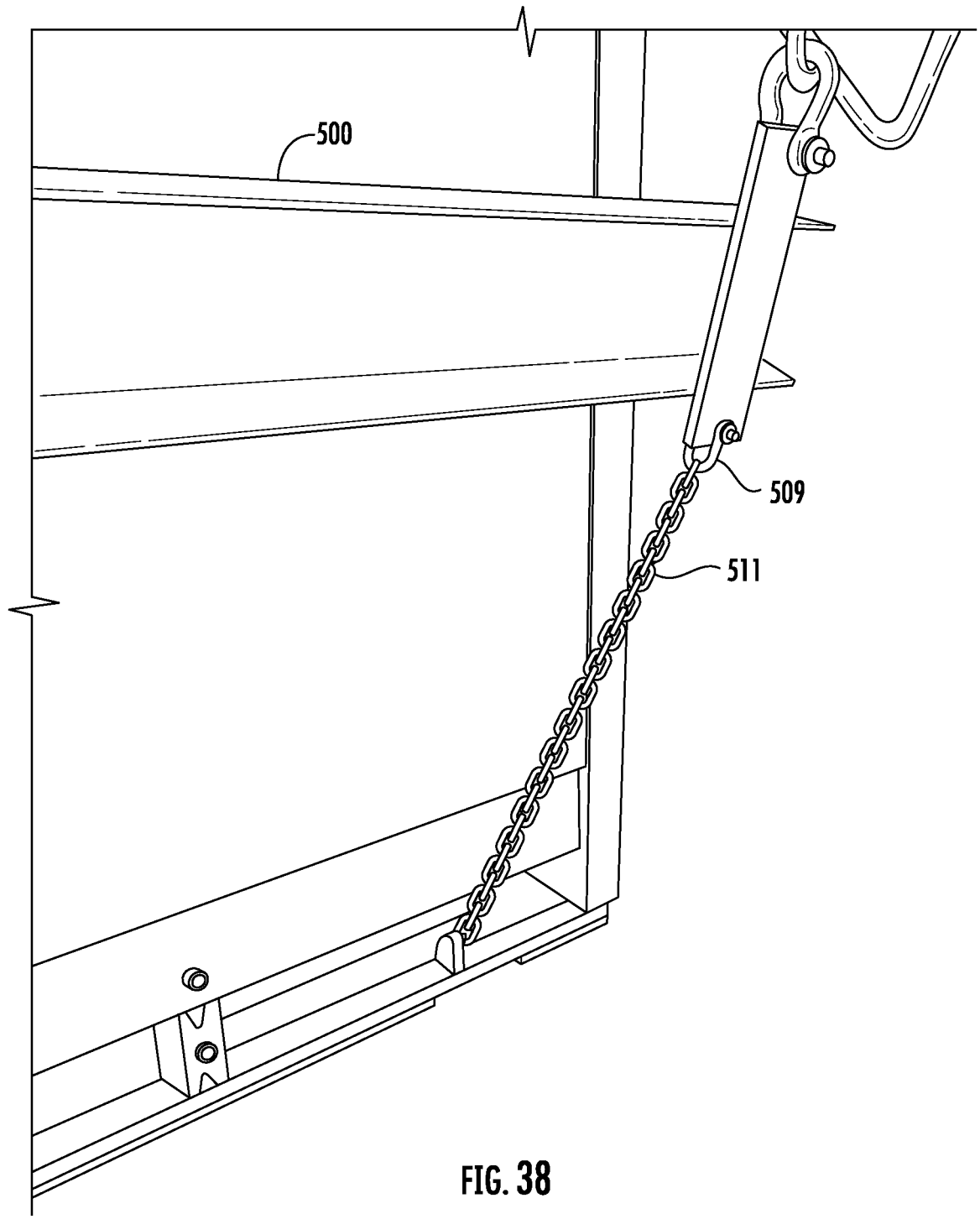
Figure 39:
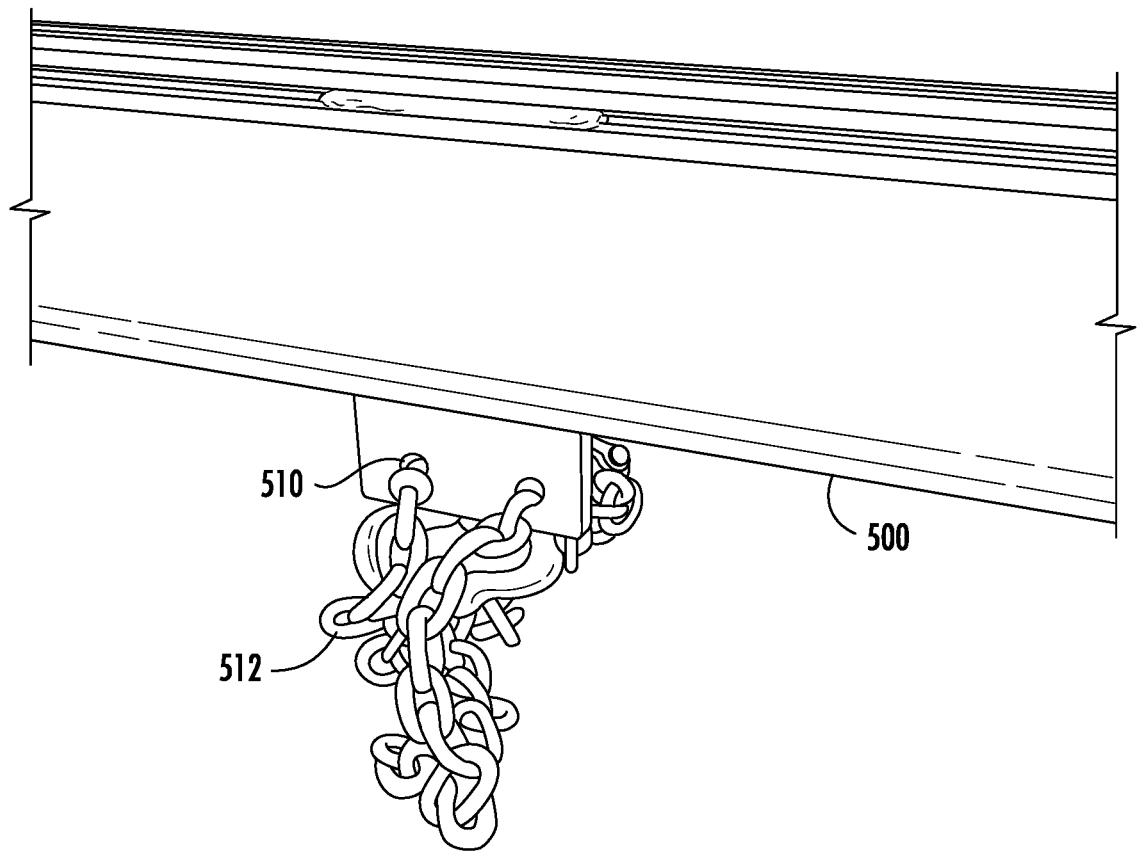
Figure 42:
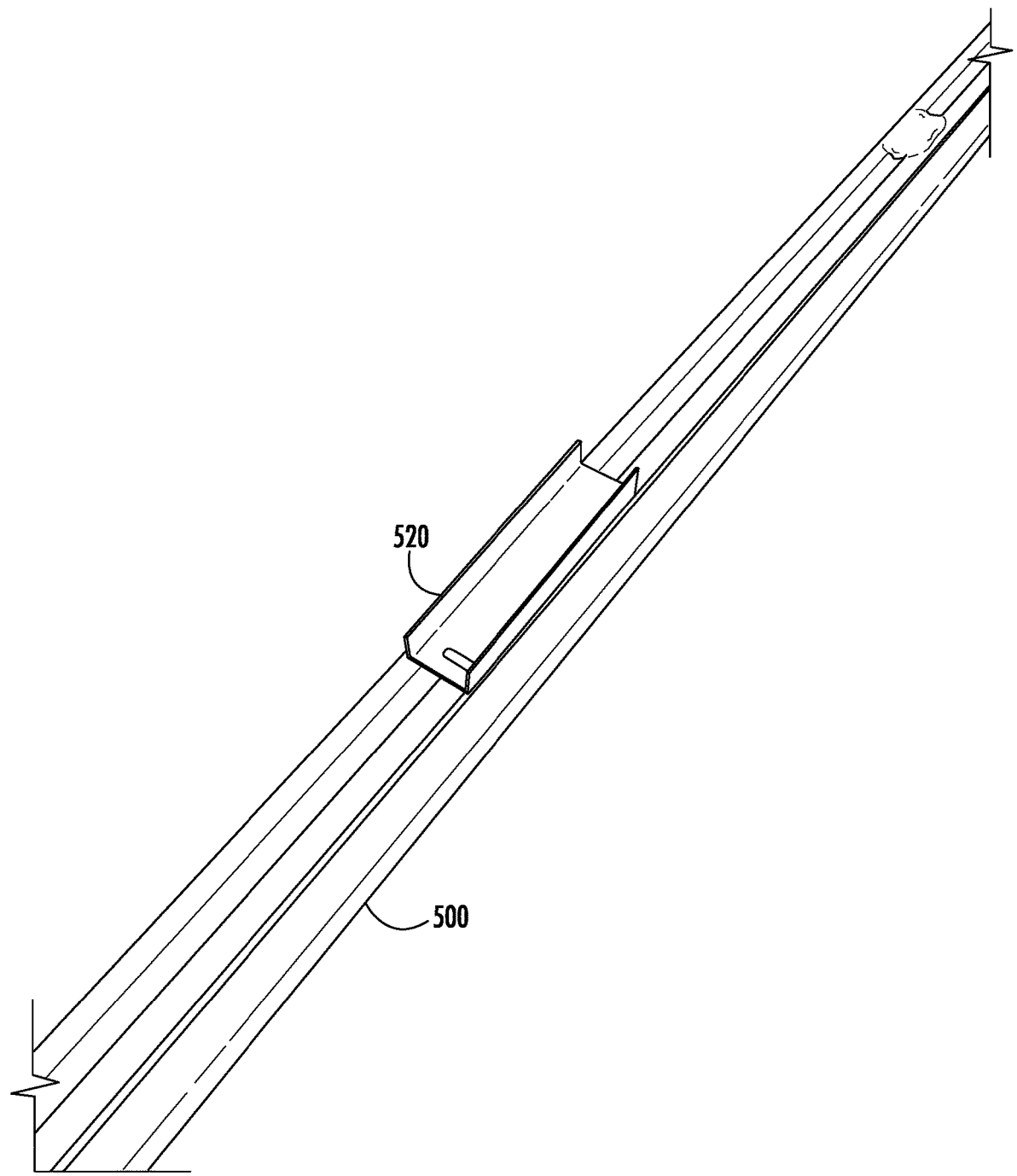
Figure 43:
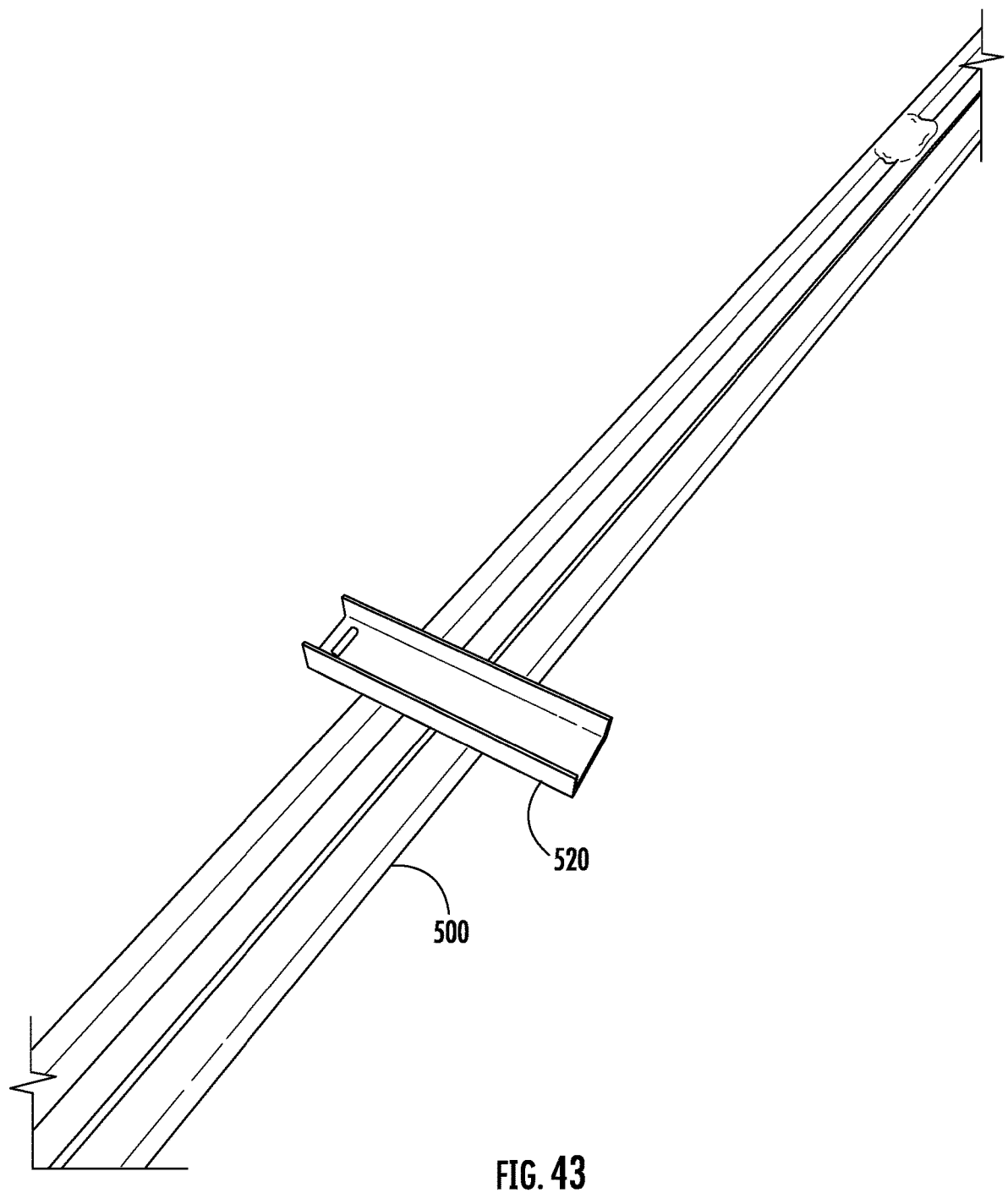

As illustrated in FIGS. 37 and 41, the cross-member 500 is an elongate beam. A top portion of each end of the cross-member 500 includes a clasp 508 or other releasable fastening structure configured for attachment to the second end of the cable 502 or the second end of the chain 506 for suspension therefrom. A bottom portion of each end of the cross-member 500 includes an eyelet 509 or other structure configured for attachment to another chain 511 or cable, which in turn is configured for releasable attachment to a lower portion of the container 2 or a support structure for the container 2, as shown in FIG. 38. A lower portion of an intermediate portion of the cross-member 500 includes a pair of eyelets 510 or apertures configured for attachment to a chain 512 or cable which in turn are configured for releasable attachment to the lower portion of the container 2 or the support structure for the container 2, as shown in FIG. 40. A pivotable locking member 520 is provided on a top portion of the cross-member 500 at a point intermediate the ends of the cross-member 500. Although only one of the locking members 520 is shown, it is understood that a plurality of the locking members 520 can be used. The locking member 520 is provided to pivot from the stored position shown in FIG. 42 to the open position shown in FIG. 43 to abut a frame member of the system 10 to provide additional stability during transport of the container 2.

In use, the container 2 is supported on each end by the second end of the chain 511 or the cable and at the intermediate portion by the chain 512 or the cable attached to the eyelets 510 or apertures as shown in FIG. 40. The movable members 62 in sliding engagement with the stanchions 32 are extended to lift the container 2 or retracted to lower the container 2 as previously described herein. The actuators 67 may be employed to selectively position the movable members 62 between the upper first position and the lower second position, which in turn, causes the container 2 to also be selectively positioned between the raised first position and the lowered second position. When in the first position, the container 2 may be raised from the chassis 110 of the transport vehicle 100 and/or a pickup location and freely moved to be loaded or unloaded onto or from the transport vehicle 100. Conversely, when in the second position, the container 2 may be stationary and disposed at a desired drop-off location. Additionally, when in an intermediate position between the first and second positions of the movable members 62, the container 2 may be stationary and disposed on the chassis 110 of the transport vehicle 100 for transport thereof. A remainder of the structure and operation of the system 10 is unchanged and is substantially as described hereinabove.

From the foregoing description, one ordinarily skilled in the art can easily ascertain the essential characteristics of this disclosure and, without departing from the spirit and scope thereof, can make various changes and modifications to the present disclosure to adapt it to various usages and conditions.

What is claimed is:

1. A container handling system, comprising:
    a first frame structure configured to be coupled to a transport vehicle;
    a second frame structure movably coupled to the first frame structure, wherein the second frame structure is configured to permit a container to be at least one of loaded from and unloaded onto an irregular surface; and
    at least one drive assembly configured to move the second frame structure relative to the first frame structure, wherein a portion of the at least one drive assembly is coupled to a side rail of the second frame structure and another portion of the at least one drive assembly is coupled to a first guide member of the first frame structure via a drive mechanism.

2. The container handling system of claim 1, wherein the second frame structure is pivotably coupled to the first frame structure.

3. The container handling system of claim 1, the first frame structure includes at least one cross-member.

4. The container handling system of claim 3, wherein the at least one cross-member of the first frame structure is a hollow member configured to receive a pair of opposing movable members therein, each of the movable members is selectively positionable between a first positon and a second position.

5. The container handling system of claim 4, further comprising at least one actuator configured to selectively position the movable members of the first frame structure between the first position and the second position.

6. The container handling system of claim 4, the first frame structure includes a second guide member spaced apart from the first guide member, the first and second guide members coupled to an outboard end of each of the movable members.

7. The container handling system of claim 6, wherein the first and second guide members are positioned generally parallel to rails of a chassis of the transport vehicle.

8. The container handling system of claim 6, wherein at least one of the first and second guide members includes at least one locking element provide thereon to secure the container to the transport vehicle.

9. The container handling system of claim 1, wherein the side rail has a plurality of stanchions disposed thereon.

10. The container handling system of claim 9, wherein the stanchions are spaced apart to accommodate the container therebetween.

11. The container handling system of claim 9, wherein the second frame structure further includes at least one cross-member disposed between a corresponding pair of stanchions.

12. The container handling system of claim 11, wherein the second frame structure includes at least one cross-member disposed between a front one of the stanchions and a rear one of the stanchions.

13. The container handling system of claim 11, wherein the at least one cross-member of the second frame structure is a hollow member configured to receive a pair of opposing movable members therein, each of the movable members is selectively positionable between a first positon and a second position.

14. The container handling system of claim 13, further comprising at least one actuator configured to selectively position the movable members of the second frame structure between the first position and the second position.

15. The container handling system of claim 13, wherein the second frame structure is provided with a pulley supported by at least one of the movable members of the second frame structure and a cable received in the pulley.

16. The container handling system of claim 1, wherein the at least one drive assembly moves the second frame structure relative to the first frame structure in a longitudinal direction of a chassis of the transport vehicle between a first position and a second position.

17. A container handling system, comprising:
a first frame structure configured to be coupled to a transport vehicle;
a second frame structure movably coupled to the first frame structure, wherein the second frame structure is configured to permit a container to be at least one of loaded from and unloaded onto an irregular surface, wherein the second frame structure includes at least one side rail having a plurality of stanchions disposed thereon, wherein the second frame structure further includes at least one cross-member disposed between a corresponding pair of stanchions, wherein the at least one cross-member of the second frame structure is a hollow member configured to receive a pair of opposing movable members therein, each of the movable members is selectively positionable between a first positon and a second position, and, wherein the second frame structure is provided with a pulley supported by at least one of the movable members of the second frame structure and a cable received in the pulley.

* * * * *